US011522766B2

(12) United States Patent
Boussac et al.

(10) Patent No.: US 11,522,766 B2
(45) Date of Patent: Dec. 6, 2022

(54) METHOD AND SYSTEM FOR DETERMINING ROOT-CAUSE DIAGNOSIS OF EVENTS OCCURRING DURING THE OPERATION OF A COMMUNICATION NETWORK

(71) Applicant: EXFO Solutions SAS, Saint-Jacques-de-la-Lande (FR)

(72) Inventors: Thierry Boussac, Rennes (FR); Fabrice Pelloin, Rennes (FR)

(73) Assignee: EXFO Solutions SAS, Saint-Jacques-de-la-Lande (FR)

( * ) Notice: Subject to any disclaimer, the term of this patent is extended or adjusted under 35 U.S.C. 154(b) by 0 days.

(21) Appl. No.: 17/172,472

(22) Filed: Feb. 10, 2021

(65) Prior Publication Data

US 2021/0250222 A1      Aug. 12, 2021

Related U.S. Application Data

(60) Provisional application No. 63/050,169, filed on Jul. 10, 2020, provisional application No. 62/975,387, (Continued)

(51) Int. Cl.
*H04L 41/142* (2022.01)
*H04L 41/0631* (2022.01)
(Continued)

(52) U.S. Cl.
CPC ........... *H04L 41/142* (2013.01); *G06N 20/00* (2019.01); *H04B 17/318* (2015.01);
(Continued)

(58) Field of Classification Search
CPC ....... H04L 41/142; H04L 47/11; H04L 47/28; H04L 43/0811; H04L 43/0882;
(Continued)

(56) References Cited

U.S. PATENT DOCUMENTS

| 5,761,653 A | 6/1998 | Schiefer et al. |
| 7,467,067 B2 | 12/2008 | Marvasti |

(Continued)

FOREIGN PATENT DOCUMENTS

| CN | 102801587 A | 11/2012 |
| EP | 3648406 A2 | 5/2020 |

(Continued)

OTHER PUBLICATIONS

Qu et al., Multilevel Pattern Mining Architecture for Automatic Network Monitoring in Heterogeneous Wireless Communication Networks, Jun. 2016, China communications 13, No. 7: 108-116,Sep. 2, 2016.

(Continued)

*Primary Examiner* — Kyung H Shin
(74) *Attorney, Agent, or Firm* — Clements Bernard Baratta; Lawrence A. Baratta, Jr.

(57) ABSTRACT

The invention concerns a method and a system for determining root-cause diagnosis of events occurring during the operation of a communication network comprising monitoring time signals representative of the operation of the network to detect the occurrence of an event relative to the network traffic, and for each detected event, during the duration of said event obtaining distributions of data on several dimensions of the network linked to said event, automatically determining an event root-cause diagnosis of the detected event, called single event diagnosis, comprising at least one element of said distributions, an element being a value taken by a network dimension having a contribution in said distributions of data, the single event diagnosis determination using rules of business logic configuration organized hierarchically, which are applied according to said hierarchy to select at least one element of said distributions, (Continued)

the selection of more than one element comprising machine learning clustering.

20 Claims, 11 Drawing Sheets

Related U.S. Application Data filed on Feb. 12, 2020, provisional application No. 62/975,349, filed on Feb. 12, 2020.

(51) Int. Cl.
| | |
|---|---|
| *H04L 41/16* | (2022.01) |
| *H04L 43/028* | (2022.01) |
| *H04L 43/062* | (2022.01) |
| *H04L 41/0604* | (2022.01) |
| *H04B 17/318* | (2015.01) |
| *G06N 20/00* | (2019.01) |

(52) U.S. Cl.
CPC ........ *H04L 41/065* (2013.01); *H04L 41/0609* (2013.01); *H04L 41/16* (2013.01); *H04L 43/028* (2013.01); *H04L 43/062* (2013.01)

(58) Field of Classification Search
CPC ............... H04L 61/103; H04L 61/1511; H04L 41/06069; H04L 41/069; H04L 41/0631; H04L 41/0654; H04L 61/4511; H04L 43/08; H04L 43/16; H04L 41/16; H04W 8/02; H04W 24/08; H04W 24/02; H04B 17/345; H04B 17/318; H04B 17/3911; G06N 20/00; G06N 5/04; G06N 20/10; G06F 9/453; G06K 9/6223
See application file for complete search history.

(56) References Cited

U.S. PATENT DOCUMENTS

| | | | |
|---|---|---|---|
| 7,590,728 B2 | 9/2009 | Tonnesen | |
| 7,617,170 B2 | 11/2009 | Chesla | |
| 7,620,523 B2 | 11/2009 | Marvasti et al. | |
| 7,783,745 B1 | 8/2010 | Bhargava et al. | |
| 7,886,064 B2 | 2/2011 | Nomura et al. | |
| 7,953,685 B2 | 5/2011 | Liu et al. | |
| 8,582,457 B2 | 11/2013 | Leemet et al. | |
| 8,949,677 B1 | 2/2015 | Brundage et al. | |
| 9,026,644 B2 | 5/2015 | Parker et al. | |
| 9,122,602 B1 | 9/2015 | Jewell et al. | |
| 9,172,593 B2 | 10/2015 | Kane | |
| 9,298,538 B2 | 3/2016 | Marvasti et al. | |
| 9,414,247 B2 | 8/2016 | Huang | |
| 9,418,088 B1 | 8/2016 | Noll | |
| 9,516,053 B1 | 12/2016 | Muddu et al. | |
| 9,614,742 B1 | 4/2017 | Zhang et al. | |
| 9,654,361 B2 | 5/2017 | Vasseur et al. | |
| 9,667,521 B2 | 5/2017 | Pietrowicz et al. | |
| 9,727,533 B2 | 8/2017 | Thibaux | |
| 9,729,386 B2 | 8/2017 | Kiesekamp et al. | |
| 9,760,240 B2 | 9/2017 | Maheshwari et al. | |
| 9,853,867 B2 | 12/2017 | Baccarani | |
| 9,900,332 B2 | 2/2018 | Muddu et al. | |
| 9,952,921 B2 | 4/2018 | Kim et al. | |
| 9,961,571 B2 | 5/2018 | Yang et al. | |
| 10,061,637 B1 | 9/2018 | Halbersberg et al. | |
| 10,083,073 B2 | 9/2018 | Ambichl et al. | |
| 10,127,695 B2 | 11/2018 | Garvey et al. | |
| 10,165,457 B2 | 12/2018 | Fernandez Arboleda et al. | |
| 10,198,339 B2 | 2/2019 | Salunke et al. | |
| 10,210,036 B2 | 2/2019 | Iyer et al. | |
| 10,210,038 B2 | 2/2019 | Sasturkar et al. | |
| 10,289,473 B2 | 5/2019 | Mendes et al. | |
| 10,397,810 B2 | 8/2019 | Yang et al. | |
| 10,489,363 B2 | 11/2019 | Yang et al. | |
| 10,515,079 B2 | 12/2019 | Chamarajnagar | |
| 10,637,744 B2 | 4/2020 | Carroll et al. | |
| 10,686,681 B2 | 6/2020 | Medas | |
| 10,708,344 B1 | 7/2020 | Zhao et al. | |
| 10,715,391 B2 | 7/2020 | Rahman et al. | |
| 10,771,313 B2 | 9/2020 | Tedaldi et al. | |
| 10,867,036 B2 | 12/2020 | Komarek et al. | |
| 11,032,303 B1 | 6/2021 | Efstathopoulos et al. | |
| 11,138,163 B2 | 10/2021 | Mdini et al. | |
| 2005/0003827 A1 | 1/2005 | Whelan | |
| 2005/0216241 A1 | 9/2005 | Entin et al. | |
| 2007/0055662 A1 | 3/2007 | Edelman et al. | |
| 2013/0097463 A1 | 4/2013 | Marvasti et al. | |
| 2013/0110761 A1 | 5/2013 | Viswanathan et al. | |
| 2013/0262656 A1 | 10/2013 | Cao et al. | |
| 2015/0019916 A1 | 1/2015 | Kane | |
| 2016/0021173 A1 | 1/2016 | Tapia | |
| 2016/0183109 A1 | 6/2016 | Kiesekamp et al. | |
| 2016/0241429 A1 | 8/2016 | Froehlich | |
| 2016/0253366 A1 | 9/2016 | Hsu et al. | |
| 2017/0004166 A1 | 1/2017 | Biem et al. | |
| 2017/0085456 A1 | 5/2017 | Whitner et al. | |
| 2017/0147930 A1 | 5/2017 | Bellala et al. | |
| 2017/0161131 A1 | 6/2017 | Noll | |
| 2017/0207948 A1 | 7/2017 | Ratakonda et al. | |
| 2017/0302554 A1* | 10/2017 | Chandrasekaran | ... H04L 41/142 |
| 2017/0331673 A1 | 11/2017 | Iyer et al. | |
| 2018/0034685 A1 | 2/2018 | Naous | |
| 2018/0039555 A1 | 2/2018 | Salunke et al. | |
| 2018/0046926 A1 | 2/2018 | Achin et al. | |
| 2018/0219889 A1 | 8/2018 | Oliner et al. | |
| 2018/0276063 A1 | 9/2018 | Mendes et al. | |
| 2018/0285685 A1 | 10/2018 | Singh et al. | |
| 2018/0300737 A1 | 10/2018 | Bledsoe et al. | |
| 2018/0308001 A1 | 10/2018 | Doddala et al. | |
| 2019/0102718 A1 | 4/2019 | Agrawal et al. | |
| 2019/0124099 A1 | 4/2019 | Matselyukh et al. | |
| 2019/0132250 A1 | 5/2019 | Horn et al. | |
| 2019/0149396 A1* | 5/2019 | Zafer | .................. H04L 41/0609 709/224 |
| 2019/0163551 A1 | 5/2019 | Cheriton | |
| 2019/0165988 A1 | 5/2019 | Wang et al. | |
| 2019/0260764 A1 | 8/2019 | Humphrey et al. | |
| 2020/0059800 A1* | 2/2020 | Menon | .................. H04B 17/318 |
| 2020/0082013 A1 | 3/2020 | Triplet et al. | |
| 2020/0136891 A1 | 4/2020 | Mdini et al. | |
| 2020/0167393 A1 | 5/2020 | Gottlob et al. | |
| 2020/0183946 A1 | 6/2020 | Pelloin | |
| 2020/0278972 A1 | 9/2020 | Zhou et al. | |
| 2021/0006453 A1 | 1/2021 | Dutta et al. | |
| 2021/0014107 A1 | 1/2021 | Mijumbi et al. | |
| 2021/0110294 A1* | 4/2021 | Elewitz | .................. G06N 20/00 |
| 2021/0385331 A1 | 12/2021 | Kovvali et al. | |

FOREIGN PATENT DOCUMENTS

| | | |
|---|---|---|
| EP | 3764592 A1 | 1/2021 |
| EP | 3849142 A1 | 7/2021 |
| EP | 3866395 A1 | 8/2021 |
| JP | 4721362 B2 | 4/2011 |
| WO | 2012113436 A1 | 8/2012 |
| WO | 2014040633 A1 | 3/2014 |
| WO | 2016169616 A1 | 10/2016 |
| WO | 2017172541 A1 | 10/2017 |
| WO | 2017220107 A1 | 12/2017 |
| WO | 2018188733 A1 | 10/2018 |

OTHER PUBLICATIONS

Wang et al., An Algorithm for Mining of Association Rules for the Information Communication Network Alarms Based on Swarm Intelligence, Hindawi Publishing Corporation, Mathematical Problems in Engineering, vol. 2014, Article ID 894205, 14 pages, Jan. 1, 2014 [Online], [retrieved on Feb. 12, 2021] Retrieved from the Internet <URL: https://www.hindawi.com/journals/mpe/2014/894205/abs/>.

(56) References Cited

OTHER PUBLICATIONS

Brauckhoff et al.,Anomaly extraction in backbone networks using association rules, Proceedings of the 9th ACM SIGCOMM conference on Internet measurement, pp. 28-34, Nov. 4, 2009, [Online], [retrieved on Feb. 12, 2021], Retrieved from the Internet <URL: https://hal.archives-ouvertes.fr/hal-00527139/document >.

Agrawal et al.,Mining association rules between sets of items in large databases, May 1993,In Proceedings of the 1992 ACM SIGMOD international conference on Management of data (SIGMOD '93). Association for Computing Machinery, New York, NY, USA, 207-216. [Online], [retrieved on Feb. 12, 2021], Retrieved from the Internet <URL: https://doi.org/10.1145/170035.170072>.

Azevedo et al., Comparing Rule Measures for Predictive Association Rules, In Machine Learning: ECML 2007, [Online], [retrieved on Feb. 2, 2021], Retrieved from the Internet <URL: https://doi.org/10.1007/978-3-540-74958-5_47>.

Van Melle et al., Rule-based expert systems: the EMYCIN experiments of the Stanford Heuristic Programming Project, Chapter 15, EMYCIN: A knowledge Engineer's Tool for Constructing Rule-Based Expert Systems, 1984, CUMINCAD. Addison Wesley, Reading, MA.

Chen et al., Failure Diagnosis Using Decision Trees, May 2004, In International Conference on Autonomic Computing, 2004. Proceedings. IEEE, 36-43 New York, NY, USA.

M. Demetgul, Fault diagnosis on production systems with support vector machine and decision trees algorithms, 2013, The International Journal of Advanced Manufacturing Technology 67, 9-12 (2013), 2183-2194. ISBN: 0268-3768, Springer Verlag. Nov. 23, 2012.

Gardner et al., Alarm correlation and network fault resolution using the Kohonen self-organising map., GLOBECOM 1997. IEEE Global Telecommunications Conference. Conference Record, vol. 3. IEEE, 1398-1402. IEEE, Phoenix, AZ.

Han et al., Mining Frequent Patterns without Candidate Generation: A Frequent-Pattern Tree Approach. Data Mining and Knowledge Discovery 8, 1 (Jan. 2004), 53-87.,[Online], [retrieved on Feb. 2, 2021], Retrieved from the Internet <URL: https://doi.org/10.1023/B:DAMI.0000005258.31418.83>.

Leskovec et al., Mining of Massive Datasets (2nd ed.), 2014, Cambridge University Press, USA.

Lin et al., Fast Dimensional Analysis for Root Cause Investigation in a Large-Scale Service Environment, Proceedings of the ACM on Measurement and Analysis of Computing Systems 4, 2 (Jun. 2020), 1-23., arXiv: 1911.01225 version: 2. [Online], [retrieved on Feb. 2, 2021] Retrieved from the Internet <URL: https://doi.org/10.1145/3392149>.

Perri et al. Abductive logic programs with penalization: semantics, complexity and implementation, arXiv preprint cs/0310047 (2003). Theory and Practice of Logic Programming 5, 1-2 (2003), 123-159.

Sampath et al. Failure diagnosis using discrete-event models. IEEE transactions on control systems technology 4, 2 (1996), 105-124. ISBN: 1063-6536 Publisher: IEEE.

Tan et al., Introduction to Data Mining, (First Edition). Addison-Wesley Longman Publishing Co., Inc., USA. A fault analysis framework for cellular networks using scalable association rule mining KDD '21, Aug. 14-18, 2021, Singapore, NY.

Hermann Wietgrefe, Investigation and practical assessment of alarm correlation methods for the use in GSM access networks, NOMS 2002. IEEE/IFIP Network Operations and Management Symposium. 'Management Solutions for the New Communications World'(Cat. No. 02CH37327). IEEE, 391-403. ). IEEE, Florence, Italy.

Ye et al., Board-level functional fault diagnosis using multikernel support vector machines and incremental learning. IEEE Transactions on Computer-Aided Design of Integrated Circuits and Systems 33, 2 (2014), 279-290. ISBN: 0278-0070 Publisher: IEEE.

Zawawy et al., Requirements-driven root cause analysis using Markov logic networks. In International Conference on Advanced Information Systems Engineering. CAiSE 2012, LNCS 7328, pp. 350-365, 2012, Springer-Verlag Berlin Heidelberg 2012.

Brin et al., Dynamic Itemset Counting and Implication Rules for Market Basket Data. SIGMOD 1997 Arizona USA, Rec. 26, 2 (Jun. 1997), 255-264.

Alzira Faria, A Methodology for Filtering Association Rules. Revista de Ciências da Computação II, 2 (Jan. 2007), 14-25.

Alipio Jorge, Hierarchical Clustering for thematic browsing and summarization of large sets of Association Rules, 2004 SIAM International Conference on Data Mining, Orlando, Florida.

Shvachko et al., The hadoop distributed file system. In Symposium on mass storage systems and technologies (MSST). IEEE, Incline Village, NV, USA, 1-10, 2010.

Zaharia et al., Spark: Cluster computing with working sets. In Proceedings of the 2nd USENIX Conference on Hot Topics in Cloud Computing (HotCloud'10), vol. 10. USENIX Association, USA, 2010.

Toivonen et al., Pruning and Grouping Discovered Association Rules,1995, Department of computer Science, University of Helsinki, Finland.

Tan et al., Selecting the right objective measure for association analysis. Information Systems 29, 4 (2004), 293-313., Elsevier, Department of Computer Science, University of Minnesota, 200 Union Street SE, Minneapolis, MN 55455, USA.

Jun. 10, 2021, Extended European Search Report for European Application No. EP 21 15 6335.

Mdini et al., ARCD: a Solution for Root Cause Diagnosis in Mobile Networks. 14th International Conference on Network and Service Management (CNSM), Nov. 2018, Roma, Italy, hal-01962869.

Mdini, Create your own Artificial Intelligence to monitor your Linux System! Europython, Edinburgh Jul. 23-29, 2018.

Mdini et al., Monitoring the Network Monitoring System: Anomaly Detection using Pattern Recognition, May 2017, IMT Atlantique, Astellia, France.

Palacios et al., Automatic feature selection technique for next generation self-organizing networks, IEEE Communications Letters, vol. 22, No. 6, Jun. 2018.

Monge et al. Reasoning and knowledge acquisition framework for 5G network analytics, Oct. 21, 2017, Sensors.

E. J. Khatib, Data analytics and knowledge discovery for root cause analysis in LTE self-organizing networks, PhD dissertation, 2017, University of Malaga.

Munoz et al., A method for identifying faulty cells using a classification tree-based UE diagnosis in LTE, 2017, 2017:130, DOI 10.1186/s13638-017-0914-3, EURASIP Journal on Wireless Communications and Networking.

Klaine et al., A Survey of Machine Learning Techniques Applied to Self-Organizing Cellular Networks, Jul. 12, 2017, doi:10.1109/COMST.2017.2727878, IEEE Communications Surveys and Tutorials.

Liu et al., GA-AdaBoostSVM classifier empowered wireless network diagnosis, 2018, 2018:77, EURASIP Journal on Wireless Communications and Networking.

Moysen et al., A Reinforcement Learning based solution for Self-Healing in LTE networks, 2014, 978-1-4799-4449-1/14, IEEE.

Gogoi et al., Efficient Rule Set Generation using Rough Set Theory for Classification of High Dimensional Data, 2011 International Journal of Smart Sensors and Ad Hoc Networks (IJSSAN) Issn No. 2248-9738 (Print) vol. 1, Issue—2.

3GPP, 3rd Generation Partnership Project;Technical Specification Group Services and System Aspects; Telecommunication management; Charging management; Charging Data Record (CDR) parameter description (Release 15), Dec. 2018, TS 32.298 V15.5.1.

Leifler, Comparison of LEM2 and a Dynamic Reduct Classification Algorithm, Masters Thesis, Oct. 9, 2002, LiTH-IDA-EX-02-93, Artificial Intelligence & Integrated Computer Systems Division, Dept. of Computer and Information Science, Linkopings universitet.

Fortes et al., Location-based distributed sleeping cell detection and root cause analysis for 5G ultra-dense networks, 2016, 2016:149, DOI 10.1186/s13638-016-0649-6, EURASIP Journal on Wireless Communications and Networking.

Hanemann, A Hybrid Rule-Based/Case-Based Reasoning Approach for Service Fault Diagnosis, available on May 23, 2019, Leibniz Supercomputing Center, Munich, Germany.

(56) References Cited

OTHER PUBLICATIONS

Zheng et al., 3-Dimensional Root Cause Diagnosis via Co-analysis, Sep. 18-20, 2012, ACM 978-1-4503-1520-3/12/09, San Jose, USA.
Mahimkar et al, Towards Automated Performance Diagnosis in a Large IPTV Network, Aug. 17-21, 2009, ACM 978-1-60558-594-9/09/08, Barcelona, Spain.
Dimopoulos et al., Identifying the Root Cause of Video Streaming Issues on Mobile Devices, Dec. 1-4, 2015, DOI: 10.1145/2716281.2836109, Heidelberg, Germany.
Mahimkar et al., Rapid Detection of Maintenance Induced Changes in Service Performance, Dec. 6-9, 2011, ACM 978-1-4503-1041-3/11/0012, Tokyo, Japan.
Nagaraj et al., Structured Comparative Analysis of Systems Logs to Diagnose Performance Problems, available May 23, 2019, Purdue University.
Steinder et al., A survey of fault localization techniques in computer networks, Jul. 1, 2014, Science of Computer Programming 53 (2004) 165-194, United States.
Khatib et al., Data mining for fuzzy diagnosis systems in LTE networks, Jun. 1, 2015, Expert Systems with Applications 42 (2015) 7549-7559, Elsevier Ltd., Spain.
Palacios et al., Combination of multiple diagnosis systems in Self-Healing networks, Jul. 22, 2016, Expert Systems With Applications 64 (2016) 56-68, Elsevier Ltd., Spain.
Fortes et al., Contextualized indicators for online failure diagnosis in cellular networks, Apr. 4, 2015, Computer Networks 82 (2015) 96-113, Elsevier B.V., Spain.
Jin et al., Nevermind, the Problem Is Already Fixed: Proactively Detecting and Troubleshooting Customer DSL Problems, Nov. 30-Dec. 3, 2010, ACM 1-4503-0448-1/10/11, Philadelphia, USA.
Zhang et al, On Assuring End-to-End QoE in Next Generation Networks: Challenges and a Possible Solution, Jul. 2011, 0163-6804/10, IEEE Communications Magazine.
Ong et al., A Manufacturing Failure Root Cause Analysis in Imbalance Data Set Using PCA Weighted Association Rule Mining, Aug. 11, 2015, Penerbit UTM Press, Melaka, Malaysia.
Mi et al., Toward Fine-Grained, Unsupervised, Scalable Performance Diagnosis for Production Cloud Computing Systems, Jun. 2013, IEEE Transactions on Parallel and Distributed Systems, vol. 24, No. 6, DOI: 10.1109/TPDS.2013.21, IEEE Computer Society.
Mahapatro et al., Fault Diagnosis in Wireless Sensor Networks: A Survey, 2013, IEEE Communications Surveys & Tutorials, vol. 15, No. 4, DOI: 10.1109/SURV.2013.030713.00062, IEEE.
Gomez-Andrades et al., Automatic Root Cause Analysis for LTE Networks Based on Unsupervised Techniques, Apr. 2016, IEEE Transactions on Vehicular Technology, vol. 65, No. 4, DOI: 10.1109/TVT.2015.2431742, IEEE.
Fortes et al., Context-Aware Self-Healing: User Equipment as the Main Source of Information for Small-Cell Indoor Networks, Feb. 24, 2016, IEEE vehicular technology magazine, DOI: 10.1109/MVT.2015.2479657, IEEE.
Xu et al., Industrial Big Data for Fault Diagnosis: Taxonomy, Review, and Applications, Sep. 19, 2017, IEEE Access, vol. 5, DOI: 10.1109/ACCESS.2017.2731945, IEEE.
Imran et al., Challenges in 5G: How to Empower SON with Big Data for Enabling 5G, Nov./Dec. 2014, IEEE Network, IEEE.
Mdini et al., Introducing an Unsupervised Automated Solution for Root Cause Diagnosis in Mobile Networks, 2019, IEEE, Transactions on Network and Service Management DOI: 10.1109/TNSM.2019.2954340, IEEE.
Mdini, Anomaly detection and root cause diagnosis in cellular networks. Artificial Intelligence [cs.AI]. Ecole nationale supérieure Mines-Télécom Atlantique, 2019. English. NNT : 2019IMTA0144. tel-02304602.

Decker et al., Classification in Marketing Research by Means of LEM2-generated Rules, 2007, Department of Business Administralion and Economics, Bielefeld University, Germany.
Mdini, A. Blanc, G. Simon, J. Barotin and J. Lecoeuvre, "Monitoring the network monitoring system: Anomaly petection using pattern recognition," 2017 IFIP/IEEE Symposium on Integrated Network and Service Management IM, Lisbon, 2017, pp. 983-986.
Pranab Ghosh, "Time Series Seasonal Cycle Detection with Auto Correlation on Spark" retrieved from: hllps:l/pkghosh.wordpress.com/2018/12/23/time-series-seasonal-cycle-detection-with-auto-correlation-on-spark/.
Mdini, "Create your own Artificial Intelligence to monitor your Linux System!" Europython, Edinburg Jul. 23-29, 2018.
Mdini et al., "Monitoring the Network Monitoring System: Anomaly Detection using Pattern Recognition," May 2017, IMT Atlantique, Astellia, France, pp. 1-4.
Extended European Search Report dated May 20, 2020, issued in corresponding European Application No. 19205083.9, 13 pages.
Extended European Search Report dated Apr. 29, 2020, issued in corresponding European Application No. 19206600.9, 7 pages.
Karn Rupesh Raj et al., Dynamic Autoselection and Autotuning of Machine Learning Models for Cloud Network Analytics, DOI 10.1109/TPDS.2018.2876844, IEEE Transactions on Parallel and Distributed Systems, vol. 30, Issue: 5, May 1, 2019, pp. 1052-1064, Oct. 19, 2018.
CE. Cuthill et al., Reducing the Bandwidth of Sparse Symmetric Matrices, Naval Ship Research and Development Center, Washington, pp. 157-172.
J. Han et al., Data Mining Concepts and Techniques (second edition), 2006 by Elsevier Inc., 7pp. 1-772.
Liu et al., Integrating Classification and Association Rule Mining, From: KDD-98 Proceedings. Copyright © 1998, American Association for Artificial Intelligence (www.aaai.org). Department of Information Systems and Computer Science National University of Singapore.
M. Mdini et al., "Monitoring the network monitoring system: Anomaly Detection using pattern recognition," 2017 IFIP/IEEE Symposium on Integrated Network and Service Management IM), Lisbon, 2017, pp. 983-986.
M. Mdini et al., Introducing an Unsupervised Automated Solution or Root Cause Diagnosis in Mobile Networks, IEEE Transactions on Network and Service Management, vol. 17, No. 1, Mar. 2020, pp. 547-561.
Phan-Vu et al., "A Scalable Multi-factor Fault Analysis Framework for Information Systems," in 2021 IEEE International Conference on Big Data (Big Data), Orlando, FL, USA, 2021 pp. 2621-2630. doi: 10.1109/BigData52589.2021.9671747.
M. Mdini, Root Cause Diagnosis, Nov. 22, 2017, Astellia.
M. Mdini, Anomaly Detection and Root Cause Diagnosis in Cellular Networks, Oct. 2019, retrieved from hllps//tel.archives-ouvertes.fr/tel-02304602.
M. Mdini, Monitoring the Network Monitoring System: Anomaly Detection using Pattern Recognition, Cellular Networks, Feb. 22, 2017, pp. 1-20.
G. Reali et al., Definition and Performance Evaluation of a Fault Localization Technique for an NGN IMS Network, IEEE Transactions on Network and Service Management, vol. 6, No. 2, Jun. 2009. DOI 10.1109/TNSM.2009.090605. Downloaded on Jan. 31, 2022 at 20:51:52 UTC from IEEE Xplore, pp. 122-136.
W. Van Melle, Rule-based expert systems: the MYCIN experiments of the Stanford Heuristic Programming Project, Chapter 4, The Structure of the MYCIN System, 1984, CUMINCAD. Addison Wesley, Reading, MA, pp. 67-77.
Non-Final Office Action, U.S. Appl. No. 16/659,874, dated Dec. 23, 2021, 17 pages.

\* cited by examiner

| EV(A) & EV(B) | EV(A) causes EV(B) | EV(B) causes EV(A) | EV(A) EQUIVALENT EV(B) |
|---|---|---|---|
| EV(1)&EV(3) | DIAG_EV(1) | MIX[DIAG_EV(3), DIAG_EV(4)] | MIX[DIAG_EV(1),DIAG_EV(3), DIAG_EV(4)] |
| EV(1)&EV(4) | DIAG_EV(1) | MIX[DIAG_EV(3), DIAG_EV(4)] | MIX[DIAG_EV(1),DIAG_EV(3), DIAG_EV(4)] |
| EV(2)&EV(3) | DIAG_EV(1) | MIX[DIAG_EV(3), DIAG_EV(4)] | DIAG_EV(1) |
| EV(2)&EV(4) | DIAG_EV(1) | MIX[DIAG_EV(3), DIAG_EV(4)] | DIAG_EV(1) |

FIG.9

METHOD AND SYSTEM FOR DETERMINING ROOT-CAUSE DIAGNOSIS OF EVENTS OCCURRING DURING THE OPERATION OF A COMMUNICATION NETWORK

FIELD OF THE DISCLOSURE

The present invention concerns a method and system for determining root-cause diagnosis of events occurring during the operation of a communication network. The invention is in the field of monitoring the operation of communication networks, and in particular of mobile telephony networks.

BACKGROUND OF THE DISCLOSURE

Monitoring the operation of communication networks, in particular for mobile telecommunications, is a constant concern of network operators. Indeed, it is critical to detect any anomalies in the network operation and to apply corrective measures, in order to maintain the customer satisfaction.

Various management and monitoring systems produce a large amount of real-time data, which cannot be comprehended and efficiently processed by the users (e.g. operators, technicians). In particular, the monitoring systems gather real-time data, which may include telemetry data, alarms, warnings, performance monitoring, data from passive or active probes etc., and it is possible to detect time lasting events, such as anomalies in the operation of the communication network. An important challenge is to simplify the investigation, prioritize the events and utilize the resources effectively. When receiving large amounts of information, such a challenge is difficult to achieve even for very skilled operators, and it is desirable to provide automated tools to help the operators.

In particular, it is desirable to determine automatically the root-cause of observed events, such as alarms and anomalies. Some events can be the cause of others, creating complex hierarchy links between events, and it is desirable to show those correlations and to determine automatically which one is the root cause.

Given the complexity of communication networks, the ready-to-use machine learning algorithms are not sufficient for this task.

An aim of the present invention is to provide automated root-cause diagnosis for time lasting events, with the lowest percentage of error, including single event diagnosis and diagnosis for groups of correlated event.

BRIEF SUMMARY OF THE DISCLOSURE

This and other objects are achieved by a method for determining root-cause diagnosis of events occurring during the operation of a communication network, implemented by a processor of a programmable device, comprising monitoring time signals representative of the operation of the network to detect the occurrence of an event relative to the network traffic. The method further comprises a first processing phase, comprising, for each detected event, during the duration of said event:
  obtaining distributions of data on several dimensions of the network linked to said event,
  automatically determining an event root-cause diagnosis of the detected event, called single event diagnosis, comprising at least one element of said distributions, an element being a value taken by a network dimension having a contribution in said distributions of data,
  the single event diagnosis determination using a first set of rules of business logic configuration organized hierarchically, which are applied according to said hierarchy to select at least one element of said distributions, the selection of more than one element comprising machine learning clustering.

In embodiments of the invention, the method for determining root-cause diagnosis of events occurring during the operation of a communication network according to the invention comprises one or more of the following features, considered alone or according to all technically possible combinations.

The method further comprises a second processing phase of determining a root-cause diagnosis for a group of at least two distinct events, from the single event diagnosis determined for each of the events of the group of events, based on a computation of a mathematical correlation between time signals related to said events, and applying a second set of rules of business logic configuration.

The single event diagnosis determination further comprises, for a detected event, obtaining the first set of rules of business logic configuration in association with the event, each rule defining a dimension and a test to apply to at least one element of the distributions associated to said dimension in order to select one or several elements as major contributors to the event.

A rule of the first set of rules of business logic configuration further indicates, a maximum number of elements to select, a minimum absolute contribution ratio.

The method further comprises, for at least one element of the dimension indicated in the rule, computing an absolute contribution ratio of said element, the absolute contribution ratio being equal to a percentage of occurrence of the element within the distributions linked to said event, during the event duration.

The method further comprises, for selecting a group of several elements, applying a machine learning clustering on distributions of the elements of the dimension indicated in the rule, based on the absolute contribution ratio of each element to the distributions linked to said event, during the event duration, in order to obtain a group of elements having an absolute contribution ratio higher than the minimum absolute contribution ratio.

A rule further comprises, if the maximum number of elements to select is at least equal to two, a minimum relative contribution ratio, and the machine learning clustering applies a clustering into two clusters, the method further comprising:
  computing a relative contribution ratio as a ratio between the absolute contribution ratios of the cluster centers; and
  comparing the relative contribution ratio to the minimum contribution ratio defined by the rule to select the cluster with a higher contribution according to the rule.

The machine learning clustering is a K-means clustering.

The first set of rules of business logic configuration is organized hierarchically in the form of a rule tree, and wherein at least some rules indicate a type of output among "cause", "intermediate result" and "final result", the method comprising parsing the rule tree to obtain the intermediate and/or final results.

For each event, the single event diagnosis is computed from the intermediate and final results obtained.

The determining of a group root-cause diagnosis for at least two distinct events comprises, for at least a pair of distinct events having a correlation score higher than a predetermined correlation threshold, applying the second set of rules of business logic configuration to determine whether the events of the pair of events match a relationship of "cause" or "equivalence" or whether the business logic correlation is "forbidden".

If the events of the pair of events match a relationship of "cause" or "equivalence", the events are grouped and a group root-cause is computed in function of the relationship and of the single event diagnosis of each event of the pair of events.

The second set of rules of business logic configuration defines, for a pair of events, rules on characteristics of said events, comprising dimension values in common, nature of events, network topology and single event diagnosis.

The method further comprises iteratively processing groups of events to determine a root-cause diagnosis, wherein two groups of events are merged into a larger group based on applying the second set of rules of business logic configuration on pairs of events of the two groups, a root-cause relationship being determined in function of the relationships of the pairs of events.

If, for a pair of events, applying the second set of rules results in a "forbidden" relationship, the pair of events is considered not correlated, and a corresponding information is output on a user interface.

According to an alternative, the determining of a group root-cause diagnosis, for at least two distinct events comprises, for at least a pair of distinct events having a correlation score higher than a predetermined correlation threshold, grouping said events in a provisional group and applying the second set of rules of business logic configuration to determine subgroups of events which have a common root-cause diagnosis.

The subgroups of events of the provisional group of events are determined based on topology relationships of network elements related to network dimensions associated to single event diagnosis of events.

The topology relationships include topology elements selected through a computation of a contribution ratio of each node or path common to network elements found in single event diagnosis of events of said provisional group.

A topology element with a contribution ratio higher than a predetermined ratio threshold is selected as root-cause diagnosis of a subgroup of events related to said topology element.

The monitoring of time signals representative of the operation of the network to detect the occurrence of an event relative to the network traffic comprises an adaptive computation an upper and a lower anomaly threshold value for at least one metric of said time signals, an event being detected if said metric value is above said upper anomaly threshold value or below said lower anomaly threshold value, the adaptive computation comprising statistical analysis to minimize a given function.

According to another aspect, the invention concerns a system for determining root-cause diagnosis of events occurring during the operation of a communication network, comprising a programmable device having a processor configured to monitor time signals representative of the operation of the network to detect the occurrence of an event relative to the network traffic. The processor is configured to execute a first processing phase, wherein for each detected event, during the duration of said event, the processor implements:

a module for obtaining distributions of data on several dimensions of the network linked to said event, a module for automatically determining an event root-cause diagnosis of the detected event, called single event diagnosis, comprising at least one element of said distributions, an element being a value taken by a network dimension having a contribution in said distributions of data, the single event diagnosis determination using a first set of rules of business logic configuration organized hierarchically, which are applied according to said hierarchy to select at least one element of said distributions, the selection of more than one element comprising machine learning clustering.

According to a particular feature, the processor is further configured for implementing a second processing phase of determining a root-cause diagnosis for a group of at least two distinct events, from the single event diagnosis determined for each of the events of the group of events, based on a computation of a mathematical correlation between time signals related to said events, and applying a second set of rules of business logic configuration.

The system for determining root-cause diagnosis of events occurring during the operation of a communication network is configured to implement the method for determining root-cause diagnosis of events occurring during the operation of a communication network, as briefly described above, according to all embodiments.

According to another aspect, the invention concerns a computer program product comprising software instructions, which, when implemented by a programmable device, implement a method for determining root-cause diagnosis of events occurring during the operation of a communication network as briefly described above.

According to another aspect, the invention concerns a non-transitory computer readable storage medium having computer readable code instructions stored thereon, which, when implemented by a programmable device, implement a method for determining root-cause diagnosis of events occurring during the operation of a communication network as briefly described above.

BRIEF DESCRIPTION OF THE DRAWINGS

Further characteristics and advantages of the present invention will become apparent from the following description, provided merely by way of non-limiting example, with reference to the enclosed drawings, in which:

FIG. 9 is a table listing an example of group diagnosis depending on relationships between correlated events;

DETAILED DESCRIPTION OF THE DISCLOSURE

The invention will be described hereafter in its application to a mobile telephony network, but is not limited to this application. In particular the invention applies to any type of telecommunication networks and also to communication networks such as optic fibre networks.

Figure 1:
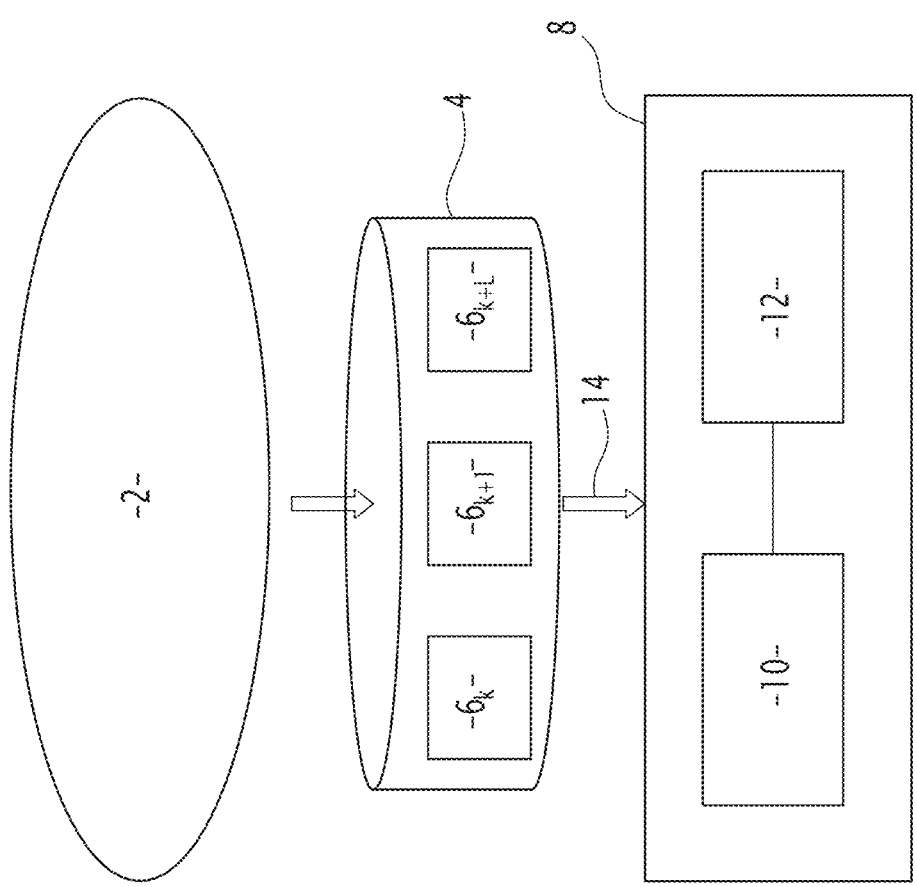
FIG. 1 illustrates schematically a communication network system and a system for determining root-cause diagnosis of events occurring during the operation of the communication network.

FIG. 1 illustrates schematically a telecommunication network 2. The architecture of the telecommunication network 2 is not detailed here, since the invention applies to any type of network architecture. Such a telecommunication network 2 is typically a system including network elements or nodes such as switches, routers, terminals, repeaters, aggregation devices, and more generally any network devices responsible for some aspect of data processing, switching, transmission. The network devices are adapted to implement a communication technology, for example a radio communication technology such as GERAN, UTRAN, eUTRAN etc.

For example, the telecommunication network 2 is based on System Architecture Evolution (SAE) and implements the LTE ("Long Term Evolution") wireless communication standard.

In the case of a mobile telephony network, user equipment (i.e. mobile telephone devices) are adapted to connect to the network for communication services, such as voice or data communication.

The telecommunication network 2 comprises equipment or probes which generate data 4 representative of the operation of the network. The data 4 is obtained, without limitation, from a Network Management System (NMS), an Element Management System (EMS), a Software Defined Networking Controller (SDN). The data 4 representative of the operation of the network 2 is generated over time, for example on successive time units.

In the case of a telephony network, the data 4 comprises Call Detail Records (CDR) or Session Detail Reports (SDR) $6_k$, $6_{k+1}$, . . . , $6_{k+L}$, which are successive time data records that document the various attributes of voice call or other telecommunications transactions (e.g. text message, data sessions, signaling or the like). The term CDR is used hereafter for these types of detailed reports.

The CDRs contain various attributes of a call/session/signaling procedure, such as time, duration, completion status, source number, destination number, handset information, involved services, involved network equipment.

CDRs are used for various purposes such as billing, logging or law enforcement. Calls conducted over multiples network equipment and interfaces lead to the generation of multiple CDRs. For example, a voice over LTE service may involve the use of 4 domains, 50 procedures, 15 interfaces and associated equipment with between 20 and 50 CDRs generated. Each CDR provides information about the status of the monitored equipment and interface.

The data 4 representative of the operation of the network is provided to a system 8 for monitoring the network operation, which is configured to raise alarms when a network operation anomaly is detected.

The data 4 is provided to the network operation monitoring system 8 via a communication link 14 through a communication network, for example the Internet, a Wide Area Network (WAN), a Local Area Network (LAN), a Virtual LAN (VLAN).

The network operation monitoring system 8 comprises a system 10 for determining root-cause diagnosis of events occurring during the operation of the telecommunication network and a user device 12 for the display of a graphical user interface (GUI) that includes a timeline visualization of the operation of telecommunication network 2, including the visualization of events. In particular, the system 10 is configured to determine, firstly, single event diagnosis (which can be also seen as root-cause diagnosis for single events), and secondly, the common root-causes diagnosis of groups of correlated event.

The term 'event' designates an anomaly in the operation status of the telecommunication network 2, detected by analysis of a time signal representative of a given aspect of the network operation, computed from the data 4 representative of the operation of the network on successive time units. The system builds in real time counters/KPis (Key Performance Indicators) from aggregating one or several data (e.g. CDRs) specific fields values on a predefined time interval. Each aggregation result is a point of the time signal representative of the operation aspect monitored. A KPI is a performance indicator computed as a combination of counters linked by a formula, for example the ratio of two counter values.

An 'event', also called 'case', occurs when the time signal exceeds an anomaly threshold value for a given duration, which is the duration of the event. The anomaly threshold values may be predetermined or adaptive, for example using linear regression. Alternatively, several anomaly threshold values may be considered in link with a severity and/or impact on the network operation, such a minor/major/critical.

For example, a time signal representative of "Call setup failure" is monitored. The time signal is built from counting CDRs of type 'call setup' with a field called 'status' having a value equal to "FAILURE" into a predefined time interval. The result of this count is one point for the time signal. This counting is done continuously on successive time intervals in real time, building the real time signal monitored. If the recorded time signal exceeds a given anomaly threshold on a sliding window, or if the signal is not between a lower and an upper anomaly threshold values, defining a "sleeve", an anomaly is detected and a case (or event) is raised.

According to an embodiment, the anomaly threshold values are determined adaptively and automatically, so as to avoid false positive results, i.e. to avoid detecting as "anomalies" some events that are not anomalies.

In particular, the parameters used for adaptively determining anomaly threshold values are computed using statistical analysis of past values of a metric over a time window of given duration, for example of one or two hours. This computation achieves "auto-tuning". For example, the metric is a number of "Call setup failure". Many other metrics may be considered, for example, in the case of telecom networks, the metrics related to CS Voice, VoIMS, roaming metric, e.g. roaming inbound, roaming outbound, user plane metrics, control plane metrics, access and mobility metrics, active testing metrics.

For example, the statistical analysis is applied using the algorithm "bound optimization by quadratic approximation", known as BOBYQA, in order to minimize a specific function.

For a set of parameters, the specific function returns a value which is the sum of:

the average difference between the anomaly threshold values, previously computed, and the base line (i.e. recorded values) of the time window, except the anomaly itself;

the average difference between the metric's values and the anomaly thresholds, plus a given margin, during the anomaly, multiplied by a factor. The factor is quite large, for example of the order of 10000 and the margin is for example of 10%;

optionally, an additional penalty given to each of the parameters, depending on the difference between the new parameter value and the original parameter value. For example, the penalty is smaller than the multiplying factor.

In an embodiment, many combinations of parameters are tested in order to minimize the specific function, and anomaly threshold values are further computed.

In an embodiment, auto-tuning is carried out periodically or is triggered by a notification from a user indicating a false positive event.

In an embodiment, the result of auto-tuning is systematically presented to a user for checking before applying the auto-tuned parameters.

Advantageously, the auto-tuning helps detecting more accurately the anomaly events (or cases) when monitoring the communication system.

Figure 2:
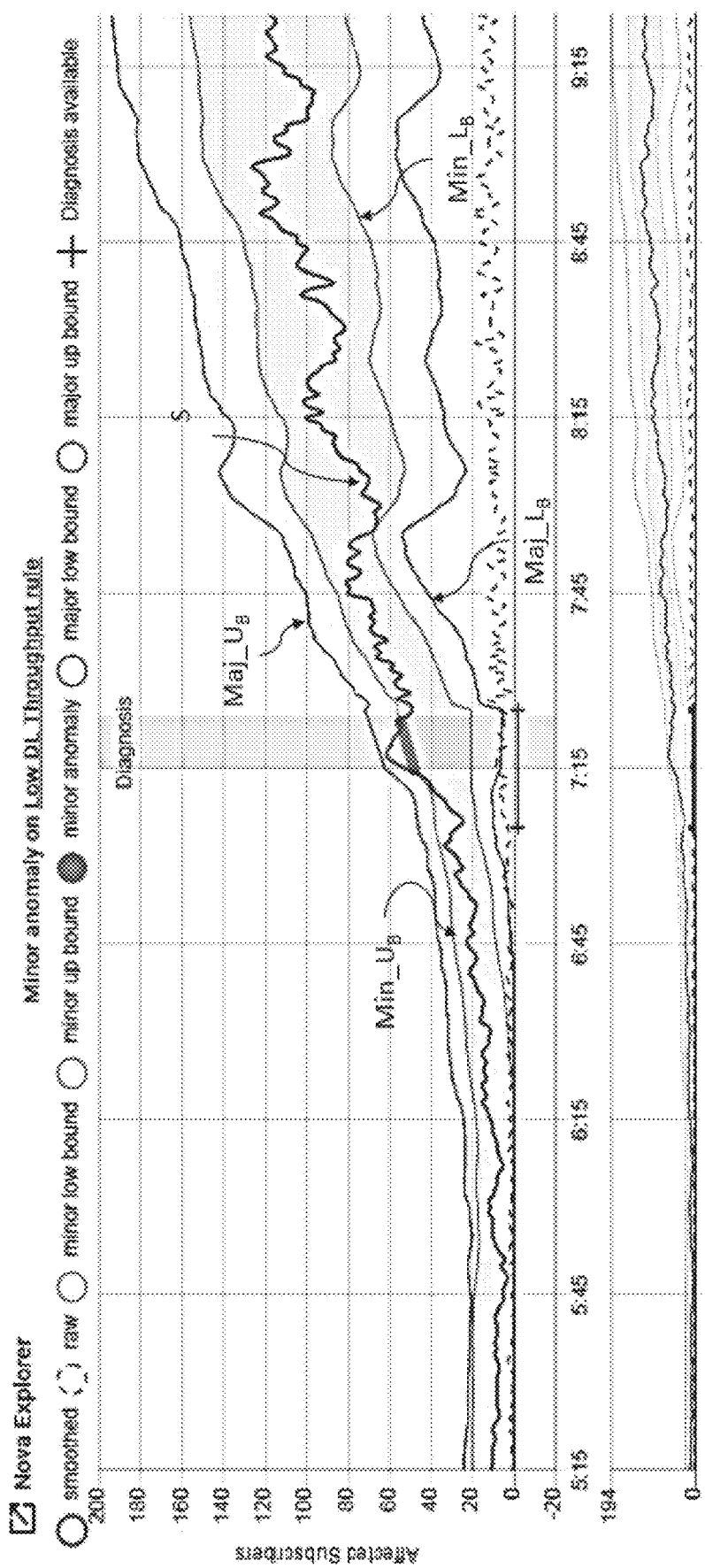
FIG. 2 is an example of time signal monitored for event detection.

FIG. 2 shows an example of a monitored time signal S, and several corresponding bounds: a major upper bound $Maj\_U_B$, a minor upper bound $Min\_U_B$, a major lower bound $Maj\_L_B$, a minor lower bound $Min\_L_B$. The major upper and lower bounds define threshold related to major anomalies. The minor upper and lower bands define thresholds related to minor anomalies. The time signal S has a portion which is higher than the minor up bound $Min\_U_B$. A minor anomaly is therefore detected, and the diagnosis determination is applied. In particular a single event (or case) is created, storing the anomaly context: severity, duration, signals and thresholds, dimensions distributions during the anomaly duration. The temporal duration of the diagnosis is shown in FIG. 2.

The system 10 for determining root-cause diagnosis of events processes recorded data 4 representative of the operation of the network. Several events are detected. For each given event, an associated single diagnosis is computed as explained in detail hereafter. Furthermore, for a plurality of events, a group root-cause diagnosis for groups of correlated is automatically determined.

Figure 3:
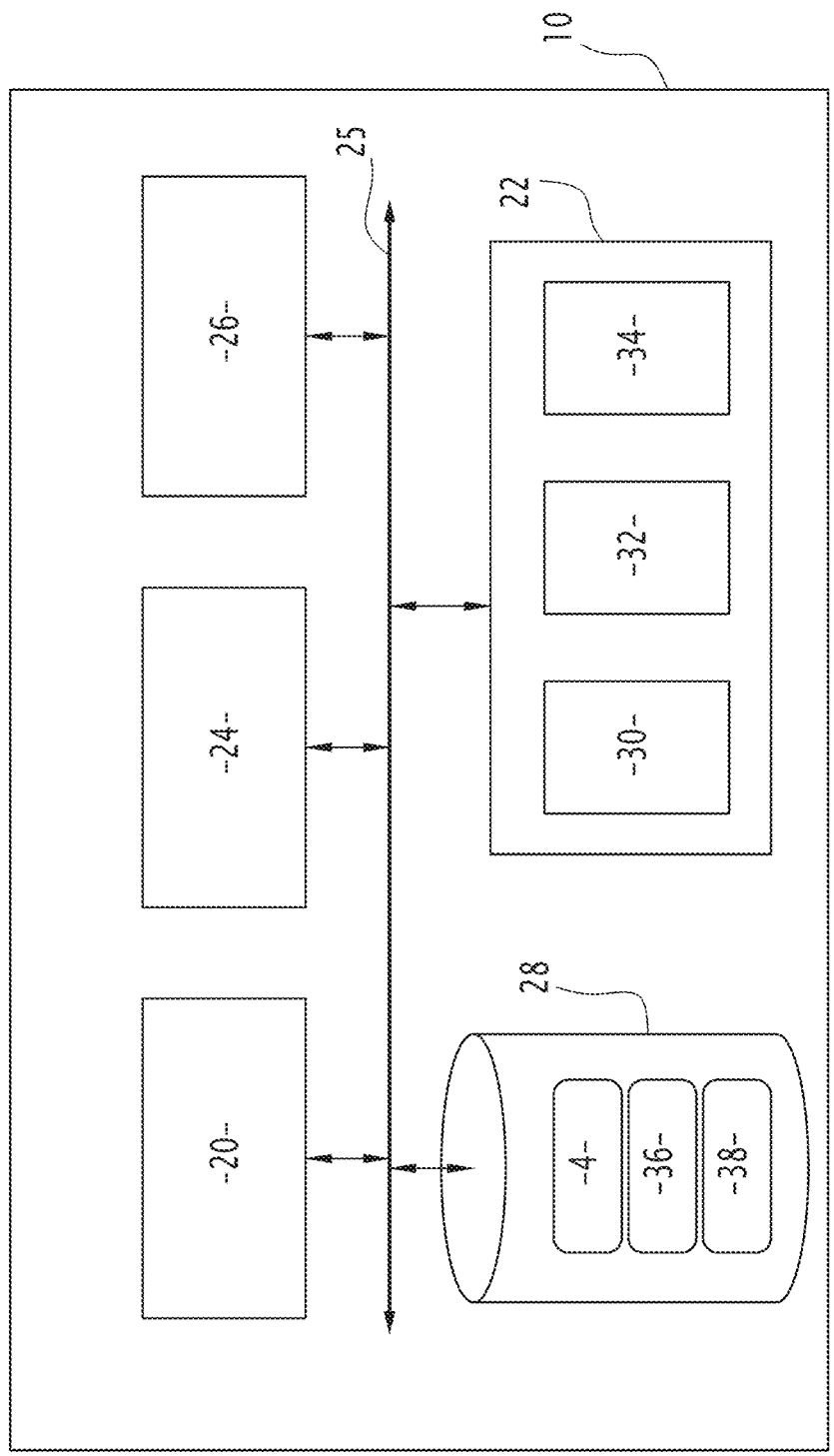
FIG. 3 is a block diagram of an embodiment of a system for determining root-cause diagnosis of groups of correlated events.

FIG. 3 shows a schematic example of a system 10 for determining root-cause diagnosis of events.

The system 10 is for example a programmable device or a general purpose computer system, comprising one or more processors 20, and an electronic memory 22. The system 10 further comprises a network interface 24, configured to receive data from the telecommunication network 2, in particular to receive data 4 representative of the network operation, stored in a data store 28. The system 10 further comprises input/output interface 26. All elements 20, 22, 24, 26, 28 are coupled via a communication bus 25.

The processor 20 is a hardware device configured to implement software instructions, such as a CPU (Central Processing Unit), a semi-conductor microprocessor (in the form of a microchip or a chipset), or more generally any device for executing software instructions. When the system 10 is in operation, the processor 20 is configured to execute software stored in memory 22.

The data store 28 is for example a non-transitory storage medium, such as an optical disk, a magneto-optical disk, any type of non-volatile memory (e.g. EPROM, EEPROM, FLASH, NVRAM), a magnetic card or and optical card. For example, the data store has an Apache Kafka® architecture for CDRs and SQL databases for storing first and second sets of rules of business logic configuration.

In an alternative embodiment, the data store 28 may be located on an external server (non represented).

The electronic memory 22 may include any of volatile memory elements, such as random access memory RAM, DRAM, SRAM, SDRAM, non-volatile memory elements such as ROM, (e.g. EPROM, EEPROM, FLASH, NVRAM), a magnetic card or and optical card. Memory 22 may have a distributed architecture, where various components are situated remotely from one another, but can be accessed by processor 20.

The processor 20 is configured to run:

a module 30 for obtaining distributions of data on several dimensions of the network system linked to each event, a module 32 for automatically determining a single event diagnosis, comprising at least one element of said distributions, an element being a value taken by a network dimension having a contribution within the distribution(s) on said dimension, using a first set of rules 36 of business logic configuration and machine learning clustering, a module 34 for determining a group root-cause diagnosis for at least two distinct events, from the single event diagnosis determined for each of the events, using a second set of rules (also called relationships) 38 of business logic configuration.

Examples of embodiments of the modules 30, 32, 34 will be given below.

The first set of rules 36 and the second set of rules 38 are recorded in data store 28. Alternatively, the first of rules 36 and the second set of rules 38 are recorded in memory 22.

The first set of rules 36 of business logic configuration comprises rules which are organized hierarchically, and can be represented as a tree structure.

The second set of rules 38 of business logic defines relationships between events, as explained in further detail hereafter.

According to an embodiment, the first and second set of rules are pre-recorded.

Alternatively, some of the rules of the sets of rules are dynamically updated.

According to an embodiment, for the first set of rules 36, an initial tree structure is provided with the help of a user, via the I/O interface 26, and some other parameters of the rules are computed automatically (in other terms, auto-tuned) and updated dynamically.

According to an embodiment, the modules 30, 32, 34 are implemented as one or several software programs, which are executed by the processor 20. Advantageously, the modules 30, 32, 34 implement a method for automatically determining root-cause diagnosis of events occurring during the operation of a telecommunication network.

In an alternative embodiment, each of the modules 30, 32, 34 is implemented by a FPGA (Field Programmable Gate Array), or a dedicated integrated circuit such as an ASIC (Applications Specific Integrated Circuit).

Figure 4:
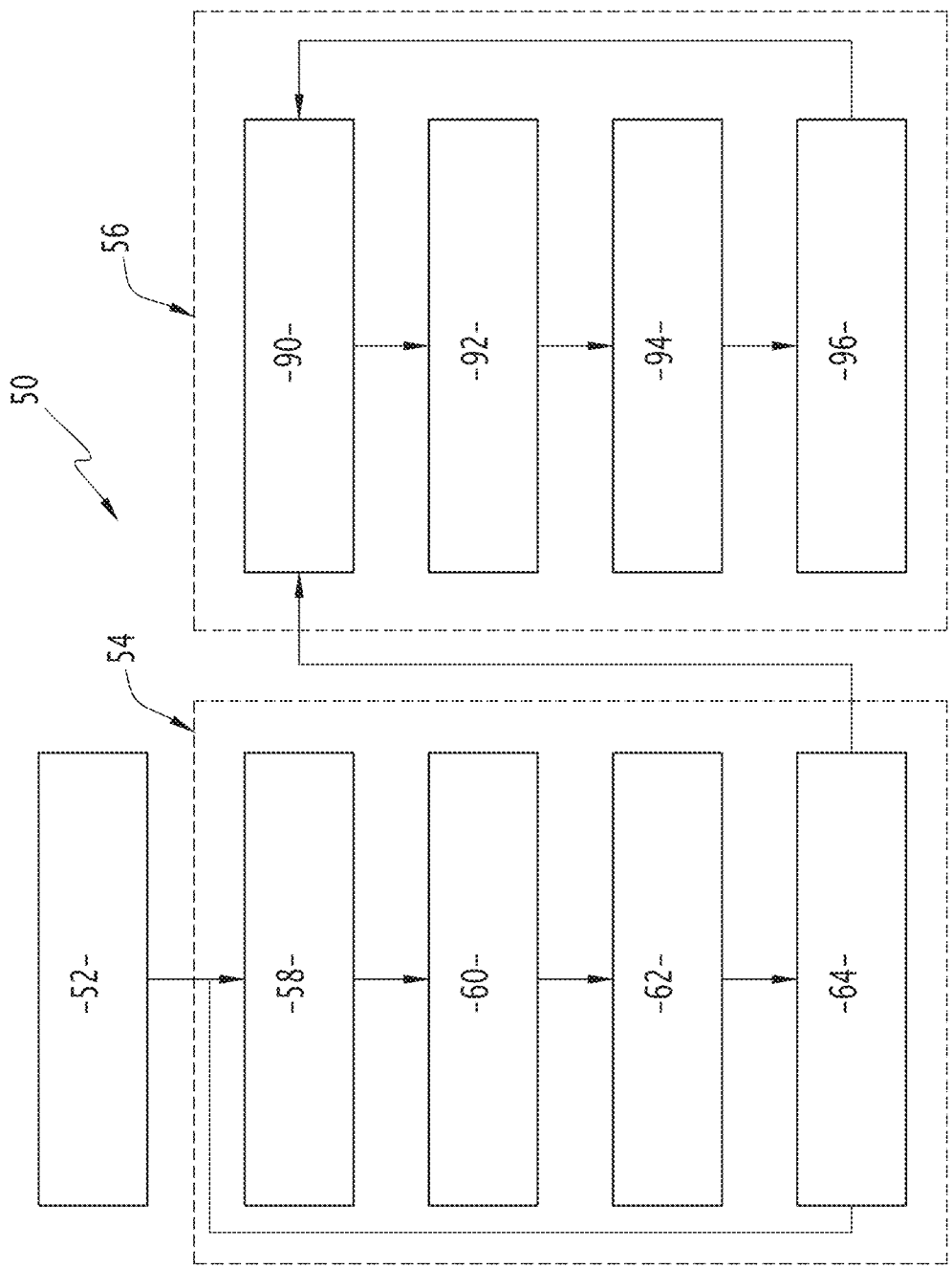
FIG. 4 is a flowchart for a method for determining root-cause diagnosis of events occurring during the operation of a communication network, according to an embodiment, comprising a first phase of determining single event diagnosis and a second phase of determining diagnosis for groups of correlated event.

FIG. 4 is a flowchart of a method 50 for determining root-cause diagnosis of events occurring during the operation of a telecommunication network according to an embodiment.

The method 50 comprises a step 52 of monitoring the occurrence of events in the network operation. As explained above, a time signal representative of a given aspect of the network operation, computed from the data 4 representative of the operation of the network on successive time units, is monitored. An 'event' occurs when the time signal exceeds an anomaly threshold value for a given duration, which is the duration of the event.

The duration of the event, and the time signal representative of the event are obtained.

The method 50 further comprises a first processing phase of 54 of determining an single event diagnosis for each detected event, and a second processing phase 56 of determining group root-cause diagnosis for groups of correlated events, when applicable, using the results of the first phase. A group of correlated events may be composed of a single event if it has no relationship or correlation with other events.

The first processing phase 54 comprises the following steps, for each detected event of given duration.

The first phase processing 54 comprises a step 58 of obtaining, from the received data representative of the network operation, distributions of data on several dimensions of the network system linked to the event, the distributions being computed during the duration of the event.

The term dimension designates different types of information that characterize the operation of the network, either related to hardware or software, for example information on network topology, types of devices, technology implemented, services, network parameters, types of alarms or errors, performance monitoring features. The dimension is related to a metric, for example, in the case of mobile telephony networks, voice metrics, roaming metrics, user plane metrics, control plane metrics, access and mobility metrics, active testing metrics.

For example, in the case of mobile telephony networks, the dimensions include 3GPP causes, cells, RAN and Core controllers, handset types, services, IP addresses etc.

The term distribution designates the statistics of occurrence of data values of the considered dimensions, during the event duration, associated to the event.

For example, if the event considered is an excessive number of "Call setup failure", the CDRs which indicate a "Call setup failure", during the event duration, are the CDRs associated to the event. The distributions on the different dimensions are computed from those CDRs which indicate a "Call setup failure".

Each distribution may comprise one or several values, depending on the nature of the associated dimension. For example, in the '3GPP' Causes' dimension, a number of 3GPP cause codes, which are defined by a standard, are the possible values within the associated distribution. A value of a dimension, which occurs in the distribution associated to the dimension during the event is called an "element of the distribution" in the following description. Such an element, also called contributor element, is said to contribute to the distribution.

Figure 5:
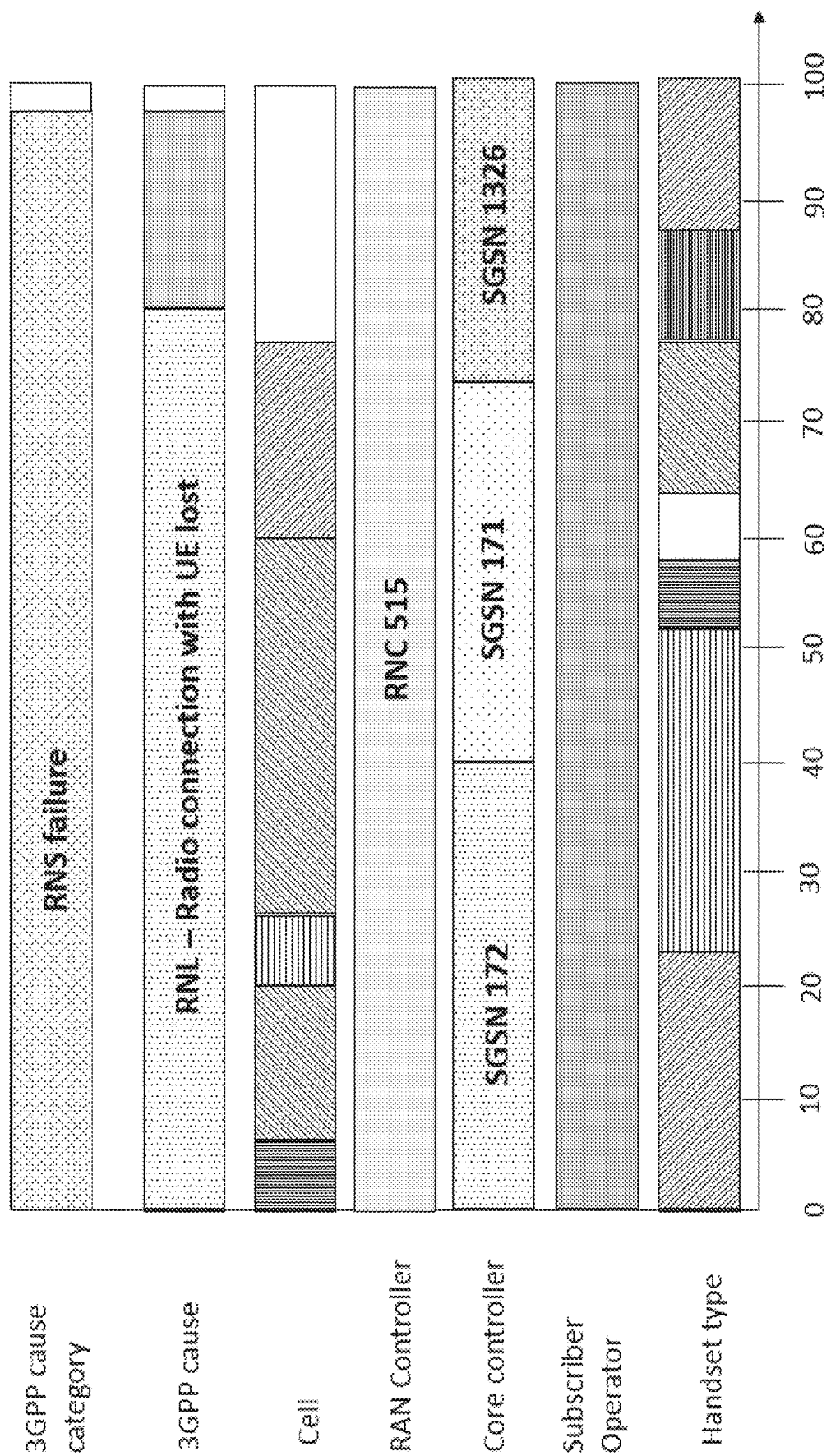
FIG. 5 illustrates an example of distributions on several dimensions.

FIG. 5 illustrates schematically an example of several distributions on several dimensions which are respectively, in the example: Handset type, subscriber operator, Core controller, RAN Controller, Cell, 3 GPP cause and 3GPP cause category. Each distribution on a dimension is represented by a bar, the contributions of various elements of the dimension being represented by chunks with different visual characteristics, i.e. different fill-in patterns. In the example of FIG. 5, several elements (types of handset) contribute to the distribution associated to "handset type" dimension, whereas one single element (operator) contributes to the distribution associated to the dimension "Subscriber operator". Furthermore, 2 elements contribute to the distribution on dimension Core Controller: SGSN (Serving GPRS Support Node) 172, SGSN 171, SGSN 1326. The RAN controller dimension distributor comprises one element, RNC 515. The "Cell" dimension distribution comprises a number of different elements which are not detailed. The 3GPP cause comprises several element, a major contributor being the element "RNL (Radio Network Layer)—Radio connection with UE lost', the 3GPP cause category element being "RNS (Radio Network Subsystem) failure".

The method further comprises a step 60 of determining elements, either a single element or a group of elements, occurring in the distributions linked to the event, which are considered to major contributors to the occurrence of the event. This determination uses a first set of rules of business logic configuration and machine learning clustering. An implementation of step 60 will be detailed hereafter with respect to FIG. 6.

The method 50 further comprises, if one or several elements considered major contributors are determined at step 60, a further step 62 of computing the event single diagnosis based on the major contributor elements. The computing of the single event diagnosis is directly based on the output of step 60, given that the elements or groups of elements have are labeled with associated labels, as explained in further detail below.

Finally, the single event diagnosis is recorded at recording step 64.

The steps 58 to 64 are repeated for each event detected, either sequentially or in parallel, depending on the number of processors available.

Figure 6:
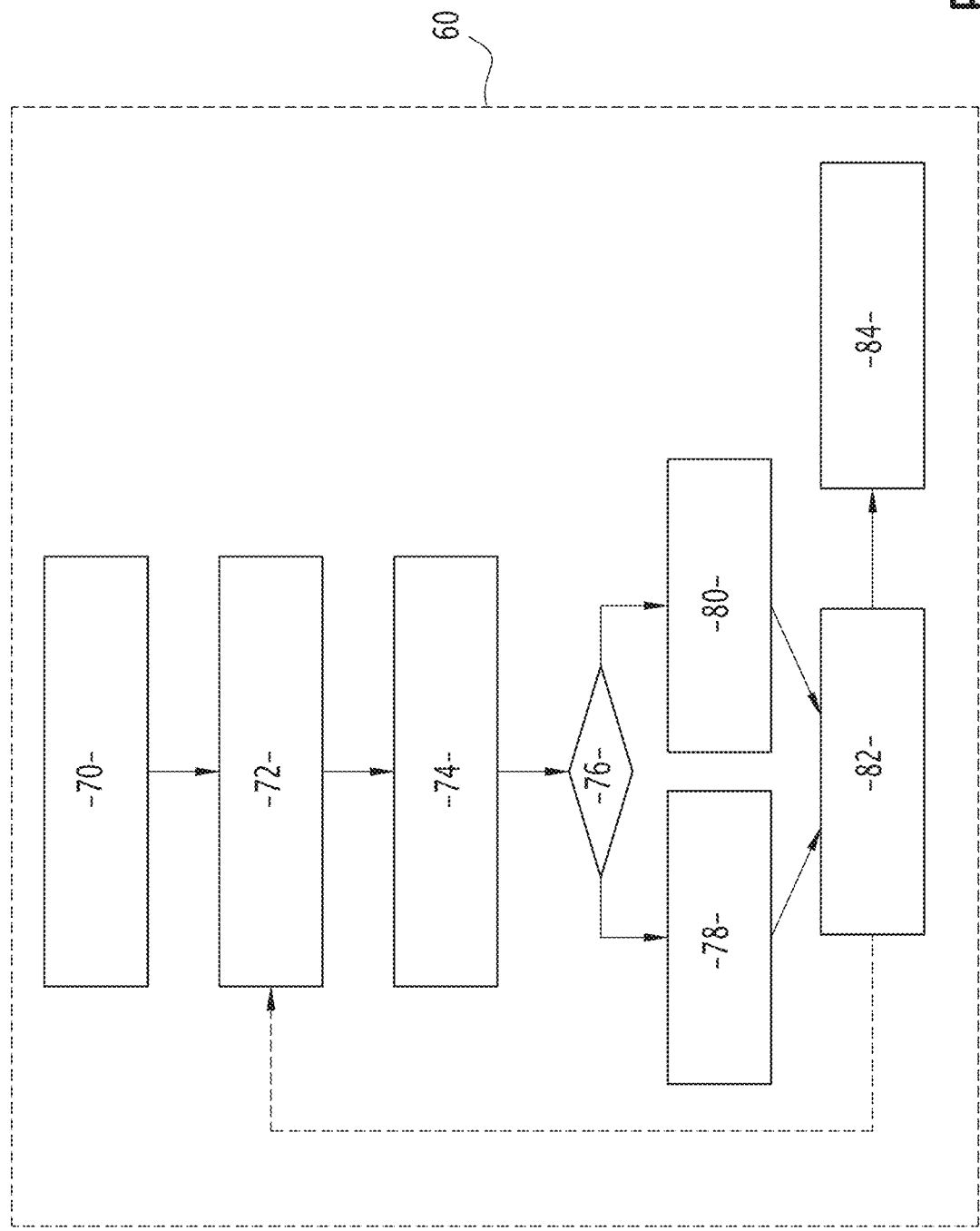
FIG. 6 is a flowchart of an embodiment of a process for determining elements within the distributions linked to the events which are considered major contributors to the occurrence of the event.

FIG. 6 is a flowchart of an embodiment of the determining 60 of elements which are major contributor elements within the distributions associated to an event, and are therefore considered as major contributors to the event.

Advantageously, business logic configuration and machine learning are combined.

The method 60 comprises a selection step 70 of selecting a first set of rules of business logic configuration, in association with the event, to apply in a given order, each rule defining a test to apply to the distribution associated to a dimension in order to identify one or several elements as major contributors to the event.

Each first set of rules has a hierarchy defining the order of testing the rules, and can be expressed in the form of a rule tree, starting with a root rule to test. The root rule has one or several children nodes, each node being associated to a rule to test. Final nodes (also called tree leaves) define final rules to test. Several levels of depths, which may be conditional to a result obtained at a higher level, may be defined.

In particular the rules designate the dimensions to consider, and tests on associated distributions. For the elements to be tested, a contribution ratio is computed, and the contribution ratio is a parameter to be tested according to each rule defined.

The contribution ratio of an element contributing to a distribution, is equal to the percentage of presence of the element within the distribution during the event duration.

For example, if a distribution $D_X$ comprises statistics (number of occurrences) of each of the following elements $\{E_1, \ldots, E_j, \ldots, E_P\}$ of the corresponding dimension, during X periods of time, the absolute contribution ratio of element $E_j$ to the distribution $D_X$ is given by:

$$CR(E_j) = \frac{\sum_{k=1}^{X} N_i(E_j)}{\sum_{k=1}^{X} \sum_{k=1}^{P} N_i(E_k)} \quad \text{[MATH 1]}$$

Where $N_i(E_j)$ is the number of occurrences of value $E_j$ during the $i^{th}$ period of time within the distribution $D_X$.

In other terms, the absolute contribution ratio of an element $E_j$ is equal to the sum of the number of occurrences of $E_j$ during the event duration divided by the total amount of occurrences of all elements of the distribution.

Clearly, the formula [MATH 1] can be easily extended to compute the absolute contribution ratio of a group formed by several elements.

For example, considering a group formed by the two elements $E_m$ and $E_n$, the absolute contribution ratio of the group is given by:

$$CR(E_m, E_n) = \frac{\sum_{i=1}^{X} (N_i(E_m) + N_i(E_n))}{\sum_{i=1}^{X} \sum_{k=1}^{P} N_i(E_k)} \quad [\text{MATH 2}]$$

It is to be noted that the absolute contribution ratio of all elements that occur in the distribution $D_X$ according to formula [MATH 1] is equal to 1.

Furthermore, a relative contribution ratio is defined, to compare the absolute contribution of a first element or of a group of elements $G_1$ to the absolute contribution of a second element of group of elements $G_2$:

$$RCR(G_1, G_2) = \frac{CR(G_1)}{CR(G_2)} \quad [\text{MATH 3}]$$

The rule tree is parsed, and for each current rule to test (step 72), the absolute contribution ratio of each element mentioned in the rule is computed at contribution ratio computation step 74.

A test 76 is applied to detect whether the test defined by the rule is to be applied to a single element or to a plurality of elements (two or more elements) of one or several distributions.

If a single element is subject of the rule, test step 76 is followed by step 78 of searching for an element satisfying the rule.

If the rule implicates determining two or more elements, test step 76 is followed by step 80 of applying a machine learning algorithm for determining a group of elements satisfying the rule. For example, K-means classification is applied to determine a group of elements which has a contribution ratio that satisfies the conditions imposed by the rule which comprise: a maximum number of elements, a minimal absolute contribution ratio. When searching for a group of elements, a minimal relative contribution ratio of the selected group of elements, relative to the complementary group of non-selected elements, is indicated by the rule.

The aim of the clustering is to select the most accurately relevant group of elements which satisfy the rule limitations, based on the absolute contribution ratios of all elements contributing to the distribution, which are provided as inputs to the clustering algorithm.

According to an embodiment, the absolute contribution ratio for each element is input, and a K-means clustering is applied to create two clusters. The absolute contribution ratio value for the center of each cluster is computed. The relative contribution ratio of the clusters is computed from the 2 cluster centers absolute contribution ratios and compared to the minimal relative contribution ratio expected by the rule. If the test succeed, meaning that the centers are far enough in terms of contribution, then the highest contribution cluster elements are kept as a group of elements of major contribution, if the absolute contribution ratio of this group of elements exceeds the minimal absolute contribution ratio expected by the rule.

It is envisaged to apply different tuning parameters to the K-means clustering in order to optimize the selection, for example in order to obtain the highest contribution ratio.

As an alternative, other machine learning unsupervised classification algorithms may be applied, such as for example Mean-shift or DBSCAN (for "Density-based Spatial clustering for applications with noise").

In some particular cases, no group of elements satisfying the rule is obtained. The failure to find a group of elements satisfying the rule is recorded. Furthermore, at least some of the rules of the first set of rules define an "output type", the output being labeled "Cause" or "Intermediate result" or "Final result", meaning that if a result (element or group of elements) satisfying the rule has been found, the result should be recorded and labeled according to the corresponding output type.

Both step 78 or 80 are followed by a step 82 of checking whether one element or a group of elements satisfying the rule tested have been found.

In case of positive answer, if the rule tested specifies an "output type", the element or groups of elements satisfying the rule are then recorded (step 84) along with the corresponding "output type" label.

Unless the output of the rule is a "final result", if there are still rules to be parsed according to the rule tree, a next rule to apply is selected and steps 72 to 84 are iterated.

If at the end of the iteration, no final result is found, the "intermediate results" ("intermediate" or "cause" type) are stored as a partial result.

Figure 7:
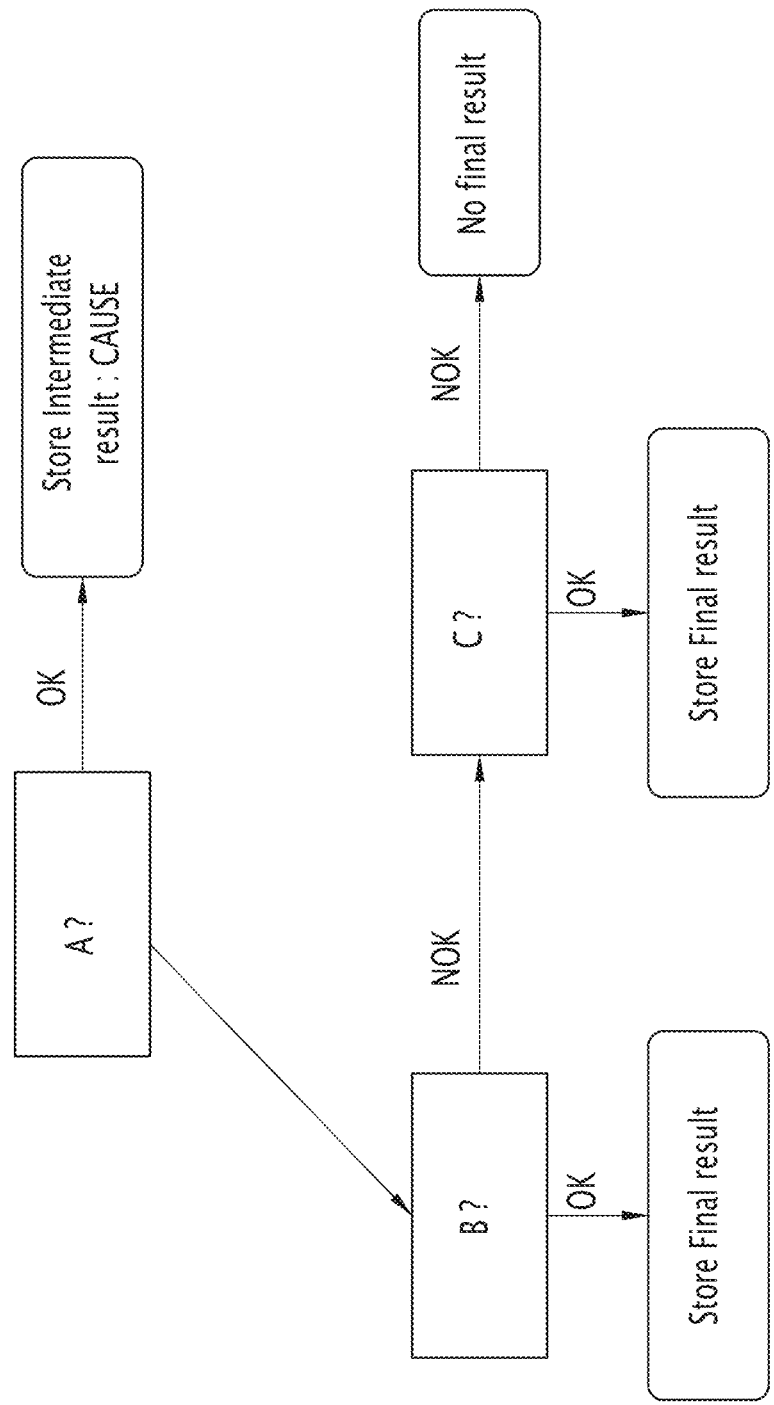
FIG. 7 is a first schematic example of a rule tree.

A simplified example of rule tree is shown in FIG. 7, comprising a root rule A, and two children rules B and C.

For the sake of explanation, a simple example is given. The event considered is "Call setup failure".

Rule A is defined as follows:
Dimension type: '3 GPP Causes'
Parent rule: none
Maximum number of elements to select: 1
Minimum absolute contribution ratio: 60%
Output type: cause In other terms, rule A indicates to search for an element E of "3 GPP Causes" with an absolute contribution ratio at least equal to 60%, or in other terms CR(E)=0.6 according to formula [MATH 1] within the distributions of dimension "3 GPP Causes" recorded for the event "Call Setup Failure".

As the rule A indicates a single element, step 78 of the method described with respect to FIG. 6 is applied.

If such an element is found, the element is stored as an intermediate result and labelled as a "cause".

If root rule A is satisfied, rule A is followed by rule B.
Rule B is defined as follows:
Dimension type: 'Cells'
Parent rule: A
Condition on ancestor's rule results: rule A provided an output element E='RAN'
Maximum number of elements to select: 12
Minimum absolute contribution ratio: 20%
Minimum Relative contribution ratio: 3
Evaluation order: 1
Output type: Final Result In other terms, rule B is the first rule among the rules which are direct children to the root rule A to evaluate, because the parameter "evaluation order" is equal to 1. Rule B indicates that if the 3 GPP cause contributing with an absolute contribution ratio of 60% is 'RAN' (radio access network), search for a group of cells (several elements, each element being a cell identifier), the group having an absolute contribution ratio at least equal to 20%, and a relative contribution ratio at least equal to 3. In other terms, the groups of cells found has to be 3 times more representative than the remaining cells. If such a group of cells is found as an output, this output is stored as a "final result". The processing of the rule tree stops.

As the rule B indicates a group of elements, step 80 of the method described with respect to FIG. 6 is applied.

Further, if no output is provided when applying rule B, if no group of cells satisfying the conditions imposed by rule B is found, the rule C is applied.

Rule C is defined as follows:
Dimension type: 'Core Controller'
Parent rule: A
Condition on ancestor's rule results: rule A provided an output element E='Core'
Maximum number of elements to select: 2
Minimum absolute contribution ratio: 70%
Minimum Relative contribution ratio: 2
Evaluation order: 2
Output type: Final Result Rule C is on the same level as rule B, and has an evaluation order equal to 2. Rule C indicates that if the 3 GPP cause contributing with a contribution ratio of 60% is 'Core', search for a group of two RAN Core controllers, the group having an absolute contribution ratio at least equal to 70%, and a relative contribution ratio at least equal to 2. If such a group of RAN core controllers is found as an output, this output is stored as a "final result". The processing of the rule tree stops.

A second example of first set of rules is given below. This set of rules will search for RAN issues, taking into account specific cases of mobile issues out of network issues. Network issues are searched at cell level first, than at RAN controller in the same conditions.

Root: RULE:A: ROOT CAUSE: [output type: CAUSE, Min Absolute ratio: 60%, 1 element]
    RULE B (evaluation order=1) ROOT CAUSE CATEGORY [CONDITION ON (ROOT CAUSE) NOT IN (No Answer, Unknow Mobile), output type: INTERMEDIATE, Min Absolute ratio: 60%, 1 element]
        RULE C (evaluation order=1), the condition is ROOT_CAUSE CATEGORY=RAN; CELL [CONDITION ON (ROOT CATEGORY=RAN), output type: FINAL, Min Absolute ratio: 30%, 10 elements, Min relative ratio=4]
        RULE D (evaluation order 2), RAN controller [CONDITION ON (ROOT CATEGORY=RAN), output type: FINAL, Min Absolute ratio: 60%, 2 elements, Min relative ratio=4]
    RULE E (evaluation order 2) HANDSET TYPE: [CONDITION ON (ROOT CAUSE) IN (No Answer, Unknow Mobile) output type: FINAL, Min Absolute ratio: 60%, 1 element]

For this rule, B and E are at same level, and C and D are at the same level.

Figure 8:
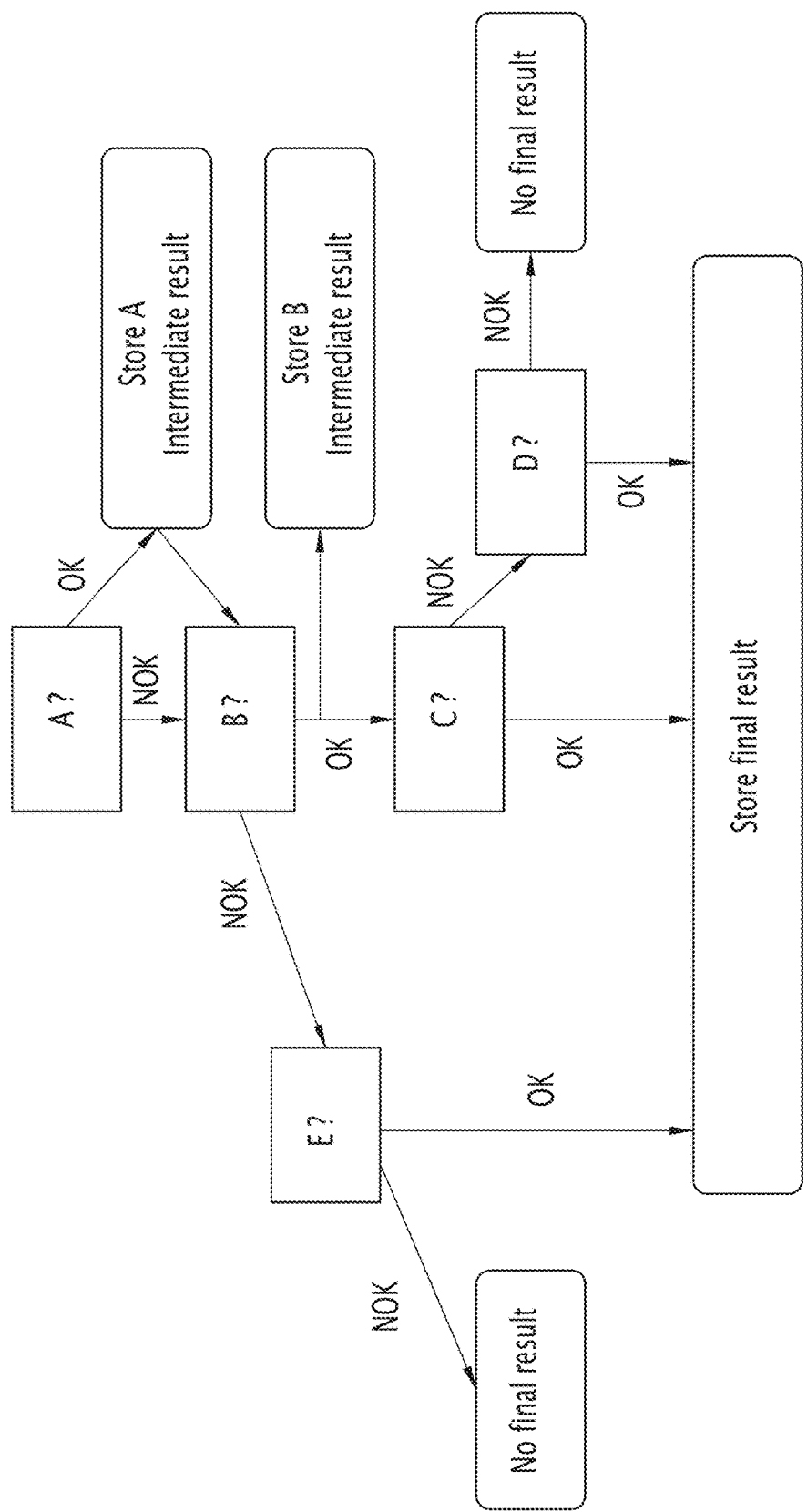
FIG. 8 is a second schematic example of a rule tree.

The rule tree corresponding to the above detailed second example of first set of rules is illustrated in FIG. 8. As can be seen, the result of the test of rule A is stored as an intermediate result of the type "cause", and the result of the test of rule B is also stored as an intermediate result.

A final result is obtained if a result satisfying rule E is found, or if a result satisfying rule C is found, or if a result satisfying rule D is found. In this example, rules C and D have the same condition, meaning that first it is expected to find a group of cells, and, if not found, a group of RAN controllers, going from specific to more generic. In some cases, no final result is found, for example if no element satisfying rule B and no element satisfying E is found, or if a result is found for rule B (which is an intermediate result), and further, no groups of elements satisfying rule C or rule D are found.

As can be understood from these simplified examples, an intermediate output may provide the cause of the anomaly observed (event), and a final result output may provide the subject of the anomaly, for example the network equipment related to the event.

It is also to be understood that the examples given are in no way limitative, any number of levels of rules to be checked, or number of rules per level may be considered.

Advantageously, the rule tree is defined by an expert of the domain, for example an expert of the mobile telephony network, so that the rule testing is optimal in terms of expected output.

Advantageously, the use of machine learning algorithms allows the efficient selection of groups of elements, satisfying multiple conditions on the absolute and relative contribution ratios. In particular, the clustering method, and the use of the relative contribution ratio of the cluster centers allows selection of most accurate groups of elements.

The output of step 60 of the method, as explained before is an element or a group of elements which are considered major contributors to the detected event.

Furthermore, these elements or groups of elements provided as output are labeled either as "cause", "final result" or "intermediate result". These elements providing the cause and subject of the event form the single event diagnosis, which, as already explained, is considered to be a root-cause diagnosis for the single event.

As explained above, with reference to FIG. 4, the method 50 for determining root cause diagnosis for events detected in a telecommunication network further has a second processing phase 56 of determining group root-cause diagnosis for groups of correlated events, when applicable, using the results of the first phase.

It is to be noted that the second processing phase takes as an input single event diagnosis provided by any type of single event diagnosis method.

In the embodiment of FIG. 4, the second processing phase 56 is applied after the first phase 54 processing of each event individually.

Indeed, it is particularly useful for a final user to receive root-cause diagnosis for groups of correlated events, since in practice, a main difficulty in a supervision system is to prioritize and process a large number of events. Furthermore, a graphical user interface is provided to present the root-cause diagnosis of a group of events, in a simplified manner, easy to understand, avoiding an overflow of information. However, if the user needs further information, the possibility is provided to access to the single event diagnosis of the events forming the group of events, and information related to the correlation between events.

According to a first embodiment, the second phase 56 comprises a computation 90 of mathematical correlation for pairs of events (or cases) which occur at the same time, even though they might have different durations. As will be explained in further detail below, the process is iterative: initially the groups of events are formed by pairs of events, and they iteratively grow by fusion with other events or groups of events.

For a given pair of events, the mathematical correlation of the time signals associated to each event is computed on the common temporal window. Preferably, the Pearson correlation score is computed.

The absolute value of the correlation score, e.g. the Pearson correlation score, obtained for a given pair of events is compared (step 92) to a predetermined correlation threshold, for example equal to 0.8.

If the absolute value of the correlation score is higher than the predetermined correlation threshold, it is proceeded with applying (step 94) a second set of rules of business logic configuration, to determine a business logic relationship between the events of the pair.

The types of business logic relationships are the following: {equivalent, cause, forbidden}.

The relationship "equivalent" means that the two events correspond to a same level of issue, and therefore the root-cause of the group formed by the two events, called group root-cause, is a mixture between the single event diagnosis causes of each of the events, resulting from the first phase of auto-diagnosis.

The relationship "cause" means that a first event of the pair of events is the cause of the second event, i.e. the other event of the pair of events. The consequence is that the single event diagnosis of the first event becomes the group root-cause.

The relationship "forbidden" means that, in spite of the mathematical correlation, some actual characteristic of the network, for example the network topology, makes impossible an actual correlation, in terms of root-causes, of the events of the pair of events. The "forbidden" relationship can break the correlation of events into a group, and therefore the user interface, e.g. the display, is modified accordingly. For example, a corresponding information indicating a "broken" correlation is provided to the user.

The second set of rules of business logic is provided also by an expert of the network, and comprises tests based on one or several characteristics of the events in relation to the characteristics of the network, including:

nature of the type of events, such as for example, in the case of mobile telephony networks, 'radio setup failure', 'call drop', 'call reject' or "call setup failure", dimension values in common between 2 events, for example a same 'RAT' value, single event diagnosis of the events considered, topology characteristics, for example the two events have two distinct RAN controllers with a direct topology Link.

For example, considering a pair of events (Event1, Event2), a second set of rules is: "if Event1 is "Credit control failure", the dimension 'RAT' has the same value for both events, and Event2 is one of (Attach Failures, Dedicated Bearer Failures) with a single diagnosis value "CN failure"". If this second set of rules is verified, the relationship between the events is a "cause" relationship, Event1 causes Event2.

It is to be noted for some pairs of events, no relationship result is found by applying the second set of rules of business logic, so that the correlation is not forbidden, but the characteristics of the events do not allow to conclude to a "cause" or "equivalent" relationship according to the preset rules.

Following step 94, if a relationship of "cause" or "equivalent" has been found, then a group root-cause is computed and attributed to the group of events at following step 96.

If no relationship of type "cause" or "equivalent" or "forbidden" is found, according to an embodiment, the events are not considered correlated.

According to an alternative, if no relationship is found, the mathematical correlation result is trusted, since the computed correlation score is above the predetermined correlation threshold, and the events are considered correlated. In this alternative mode, in order to determine the root-cause diagnosis, the correlation is recorded, and the process waits for other events/groups further correlations, that could reveal relationships. Only at the end of process, an analysis is applied in order to determine if all events have a direct or an indirect relationship within the group. If cause or equivalence relationships are found in the group of events, the highest cause as root-cause diagnosis of the group. The highest cause refers to the single event diagnosis which for an event which is cause of other events, but is not caused by any other event. Otherwise, the root-cause diagnosis is not provided, simply the single event diagnosis of the events of the group are provided.

Advantageously, according to a variant, the steps 90-96 are iterated to further consider groups of more than two events and determine group root-causes for combined groups of events.

Furthermore, if an event belongs to a group of events for which root-cause has already been determined, the processing is modified to take into account the previous grouping of events as follows.

For example, considering the following notations: EV(X) is a single event, G[X,Y] is a group of two events EV(X) and EV(Y), DIAG_EV(X) is the single event diagnosis for event EV(X) and DIAG_G[X,Y] is the root-cause diagnosis for the group G[X, Y].

For the sake of the example, we consider four independent events EV(1), EV(2), EV(3) and EV(4), and we consider that a common group root-cause diagnosis has already been found between EV(1) and EV(2), which form a group of correlated events, the group root cause diagnosis being the single event diagnosis of event EV(1) (i.e. in other terms "EV(1) causes EV(2)").

During the step 90 of computation of mathematical correlation by pairs, the correlation between pairs of events are computed, except the pair EV(1), EV(2), which are already grouped.

For example, the following Pearson correlation scores are obtained:

$$\text{CorrScore}(EV(3), EV(4)) = -0.85$$

$$\text{CorrScore}(EV(1), EV(3)) = -0.9$$

$$\text{CorrScore}(EV(2), EV(3)) = -0.75$$

$$\text{CorrScore}(EV(1), EV(4)) = 0.6$$

$$\text{CorrScore}(EV(2), EV(4)) = 0.4$$

If the correlation score threshold is equal to 0.8, then only the pairs (EV(3), EV(4)) and (EV(1), EV(3)) are retained.

The pair (EV(3), EV(4)) is then analyzed according to the second set of rules of business logic, based on the characteristics of the events as mentioned above. For example, the events EV(3) and EV(4) match an equivalence relationship: "EV(3) is equivalent to EV(4)". Therefore, a group of events G[3,4] can be formed, which has a root-cause diagnosis which is formed by mixing the single event diagnosis of both events EV(3) and EV(4).

This can be written as: DIAG_G[3,4]=MIX[DIAG_EV(3), DIAG_EV(4)]

According to an embodiment, mixing two diagnosis consists in combining the two diagnosis results, but avoid repetitions of elements if the combination contains the same results.

For example:
DIAG_EV(3): root-cause A, final results: cell A, cell B
DIAG_EV(4): root-cause B, final results: cell A, cell C
Then MIX[DIAG_EV(3), DIAG_EV(4)]: root-causes: A, B for cells A, B, C.

An analysis according to the second set of rules of business logic, based on the characteristics of the events is also applied to the pair (EV(1), EV(3)).

Furthermore, given that EV(1) belongs to the group G[1,2] and EV(3) belongs to the group G[3,4], according to an embodiment the analysis according to the second set of rules of business logic is applied to all possible combinations of pairs events between the two groups, even though the correlation score of the pairs is not higher than the predetermined correlation threshold. The analysis step is then applied to all following pairs of events:
(EV(1), EV(3); (EV(1), EV(4)); (EV(2), EV(3)); (EV(2), EV(4))

If any of these pairs of events matches a "forbidden" type relationship, then the groups G[1,2] and G[3,4] shall not be correlated, they remain separate, each group having its group root-cause diagnosis.

If none of the pair of events matches a "forbidden" relationship, then, according to an embodiment, the two groups are merged into a group of four elements G[1,2,3,4] which has a group root cause diagnosis computed according to the relationships ("cause" or "equivalent") found between the pairs of events of the merged group.

For example, if EV(1) causes EV(3) or causes EV(4), then the group root-cause diagnosis for the group G[1,2,3,4] is simply the single event diagnosis of EV(1), as illustrated in FIG. 9.

In other cases, if the "equivalent" relationship is found, a mixed group root-cause diagnosis is computed.

FIG. 9 shows a table illustrating all possible root-causes diagnosis for the above described example, according to the relationships between events.

In all scenarios, this information is very useful for an operator, as it greatly simplifies the troubleshooting.

According to a second embodiment, the second phase 56 comprises a computation of mathematical correlation for pairs of events (or cases) which occur at the same time, even though they might have different durations.

In this second embodiment, firstly, the correlated events are grouped together in a provisional group of events, and then a second set of rules of business logic is applied to split the provisional group of events into subgroups having their own relationships and a common root case diagnosis.

Then independent subgroups are created by gathering events which have hierarchical dependency. In practice, a default (also called "trash") subgroup may remain if no hierarchical relationship is found between some events which are mathematically correlated.

Analogously to the first embodiment, the types of business logic relationships are, in this second embodiment: {equivalent, cause}.

The second set of rules of business logic is provided also by an expert of the network, and comprises tests based on one or several characteristics of the events in relation to the characteristics of the network, including:

nature of the type of events, such as for example, in the case of mobile telephony networks, 'radio setup failure', 'call drop', 'call reject' or "call setup failure"

dimension values in common between 2 events, for example a same 'RAT' value single event diagnosis of the events considered topology relationships.

The topology relationships are a specific type of relationships, related to the topology of network elements. The topology information is provided by network operators. For example, RAN controllers are network elements and have associated topology.

The network topology may be represented in the form of graphs, formed of nodes, reflecting network elements, which are linked according to specific dimension values related to those network elements. The nodes of the network topology are either elements of the network or hidden infrastructure elements such as switches.

For example, in a telecommunications network, nodes can have different natures such as MME (for "Mobile Management Entity"), HSS (for "Home Subscriber Service"), SGSN (for "Serving GPRS Support Node"), eNodeB, switches, routers etc. Those elements are named in CDRs and seen as diagnosis values for dimensions reflecting network elements.

We consider topology elements which are nodes or links. A link between nodes can also be considered as root cause diagnosis of a group.

Advantageously, this second embodiment allows to point out network or hidden topology elements as root cause diagnosis of groups of events. In particular, the processing applied aims to seeking common paths within topology elements involved in events (or cases) to point out root cause diagnosis of a group of events.

In a simplified example of topology, a given node HSS1 is linked to two different MME nodes, respectively MME1 and MME2. For example MME1 is topologically linked to two eNodeB nodes, respectively eNodeB1 and eNodeB2, which are also linked according to the dimension "RAN controller", while MME2 is topologically linked to two eNodeB nodes, respectively eNodeB3 and eNodeB4. It is understood that such a graph of topology is particularly simplified, since in actual telecommunication networks, the graphs are far more complex.

Related to this simplified example of topology, considering two correlated events, if one of the events has 'eNodeB1' as diagnosis for the dimension 'RAN controller', and the other event has 'eNodeB2' as diagnosis value for the dimension 'RAN Controller', then according to the topology relationship, they form a subgroup of correlated events linked to MME1.

Figure 10:
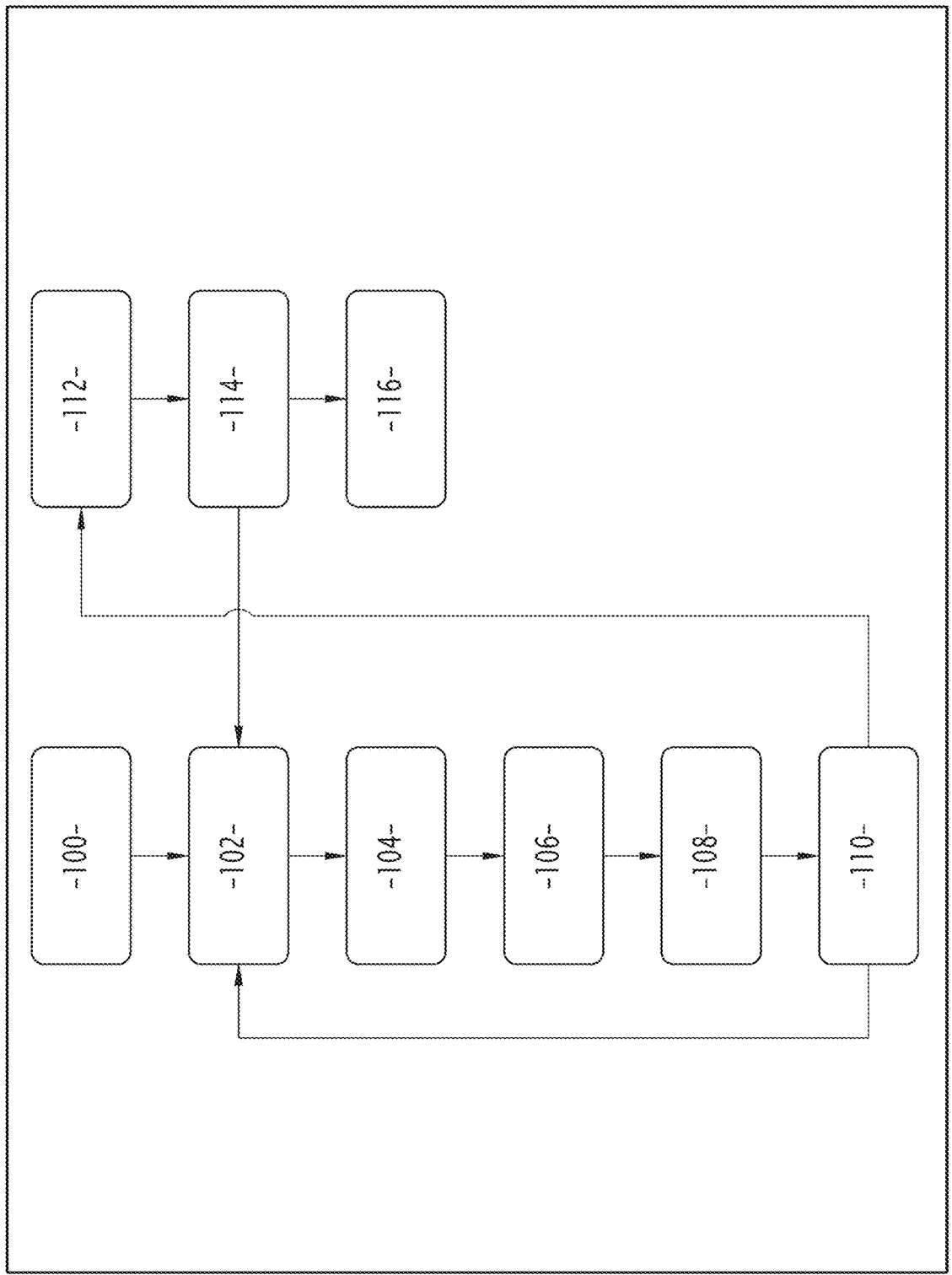
FIG. 10 is a flowchart of a second embodiment of the second phase of determining diagnosis for groups of correlated event.

FIG. 10 is a flowchart illustrating a second embodiment of the second phase 56 of the method for determining root-cause diagnosis of events occurring during the operation of a communication network.

This second embodiment comprises a first step 100 of forming a provisional group of events is formed of mathematically correlated events. For a given pair of events, the mathematical correlation of the time signals associated to each event is computed on the common temporal window. Preferably, the Pearson correlation score is computed. The absolute value of the correlation score, e.g. the Pearson correlation score, obtained for a given pair of events is compared to a predetermined correlation threshold, for example equal to 0.8.

If the absolute value of the correlation score is higher than the predetermined correlation threshold, the events are added to the provisional group of events.

Next in a step 102 all single event diagnosis values linked to network dimension values within the mathematically correlated group are retrieved, and the topological mapping for all those network dimensions are retrieved (step 104).

For each topology element associated to those network dimensions, a statistical computation step 106 is applied to find out which topology element(s) is (are) the most related to the network elements retrieved according to the topological mapping. Each node and link has a counter of associated events. The goal is to create subgroups of events (or cases) having a common node or link, according to the network topology.

For a given group of events, the retrieved topology element (node or link) which has the highest contribution ratio is retrieved at step 108. The contribution ratio is computed as follows:

$$Contrib(elt) = \left(\frac{N\_EV(Elt)}{N\_EVg}\right)^2 \times \frac{N\_path(Elt)}{N\_path\_g} \quad \text{[MATH 4]}$$

Where N_EV (Elt) is the total number of events using the considered topology element Elt, N_EVg is the number of events in the group, N_path(Elt) is the number of paths for the topology element Elt and N_path_g is the total number of paths in the group.

If the contribution ratio computed is higher than a predetermined ratio threshold Ratio_TH, the topology element is stored as common element of the group in registering step 110. For example, the ratio threshold Ratio_TH is equal to 20%.

Otherwise, steps 102 to 108 are repeated for another network dimension.

Then a filtering step 112 is applied to remove all events which are not related to the registered topology element, and the subgroup of events containing all events related to the registered network element is recorded at step 114. There could be no topology element matching the conditions (no topology relationship). The topology element associated to the subgroup becomes part of this sub-group auto-diagnosis result (a switch can be for example an auto-diagnosis result element).

The steps 102 to 114 are iterated for the remaining events, so as to obtain subgroups of events related to other topology elements. For each subgroup, a common root-cause diagnosis is computed based on the associated topology element retrieved of the subgroup.

Finally, if there are any remaining event for which no relationship (ie no common network element) has been found, these events are put (step 116) in a default subgroup.

Figure 11:
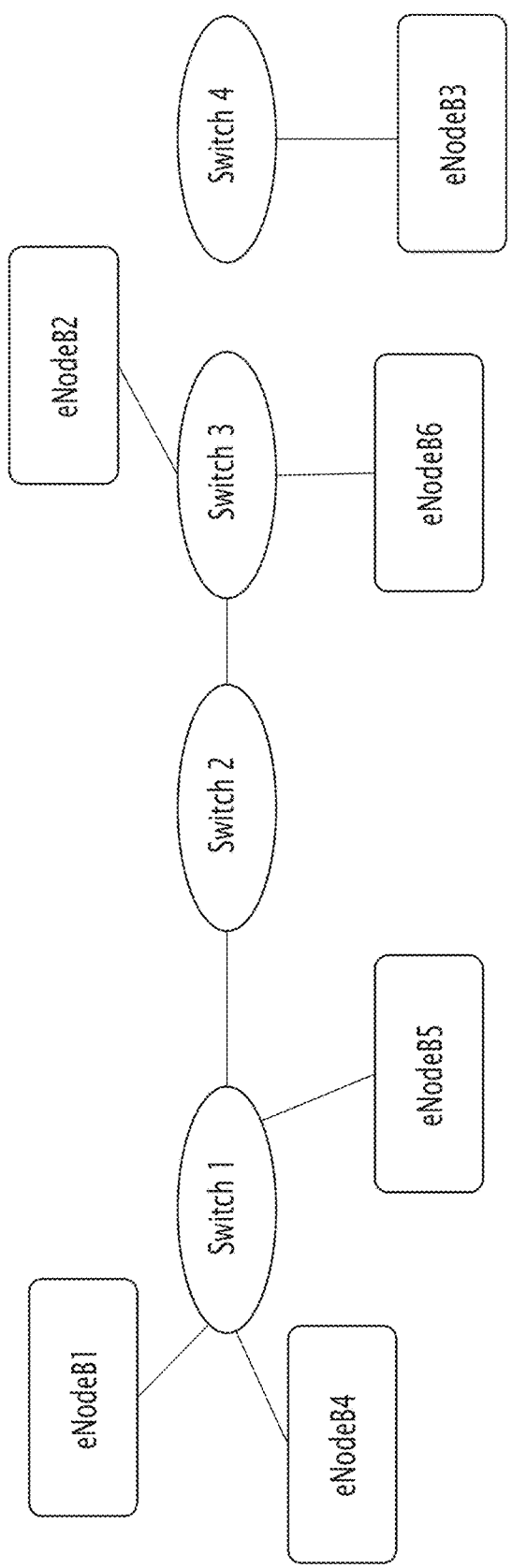
FIG. 11 is an example of a network topology used for root-cause diagnosis.

FIG. 11 illustrates an example of root-cause diagnosis resulting from an analysis according to the second embodiment described. In this example, six eNodeB elements, referenced respectively eNodeB1 to eNodeB6 and four switches referenced Switch1 to Switch4 are considered. The architecture is shown in FIG. 11: nodes eNodeB1, eNodeB4 and eNodeB5 are connected to Switch1, nodes eNodeB2 and eNodeB6 are connected to Switch3, and eNodeB3 is connected to Switch4. Furthermore, in the network architecture, both switches Switch1 and Switch3 are connected to Switch2.

In a scenario, we consider three events, EV(1), EV(2) and EV(3) (not shown in FIG. 11), which are mathematically correlated, which have respectively the following diagnosis:

EV(1): single event diagnosis eNodeB1
EV(2): single event diagnosis eNodeB2
EV(3): single event diagnosis eNodeB3

When applying the topology rule based on the single event diagnosis of these three events, ten nodes consisting of the six eNodeBs and the four switches are retrieved. The analysis of topology elements (i.e. common paths) will select the network element Switch2 as common diagnosis for EV(1) and EV(2). Therefore, these two events EV(1), EV(2) are gathered in a subgroup. The event EV(3) is kept separate from this subgroup, since eNodeB3 is connected to Switch4, which is not connected to Switch2. In other terms, no topological relationships with the topology elements related to the subgroup are found.

Advantageously, the invention provides automated root-cause diagnosis, for independent events and for groups of events. Consequently, the investigation and prioritization of the events is largely simplified.

Advantageously, the percentage of error on the automated root-cause diagnosis is close to zero thanks to the use of a first set of rules of business logic configuration to determine event root-causes and of a second set of rules of business logic configuration to determine group root-causes.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for determining root-cause diagnosis of events occurring during the operation of a communication network, implemented by a processor of a programmable device, comprising:
   monitoring time signals representative of the operation of the network to detect the occurrence of an event relative to the network traffic,
   for each detected event, during the duration of said event:
      obtaining distributions of data on several dimensions of the network linked to said event, the distributions being computed during the duration of the event, and responsive to the network being a mobile telephony network, the dimensions including a plurality of Third Generation Partnership Project (3GPP) causes, cells, Radio Access Network (RAN) controllers, Core controllers, handset types, services, subscriber operators, and Internet Protocol (IP) addresses,
      automatically determining an event root-cause diagnosis of the detected event, called single event diagnosis, comprising at least one element of said distributions, an element being a value taken by a network dimension having a contribution in said distributions of data,
      the single event diagnosis determination using a first set of rules of business logic configuration organized hierarchically, which are applied according to said hierarchy to select at least one element of said distributions, the selection of more than one element comprising machine learning clustering,
      determining a root-cause diagnosis for a group of at least two distinct events, and applying a second set of rules of business logic configuration, wherein the second set of rules defines relationships between events.

2. The method according to claim 1, wherein the determining of a root-cause diagnosis for the group of at least two distinct events, utilizes the single event diagnosis determined for each of the events of the group of events, and is based on a computation of a mathematical correlation between time signals related to said events.

3. The method according to claim 2, wherein the determining of a group root-cause diagnosis (56) for at least two distinct events comprises, for at least a pair of distinct events having a mathematical correlation score higher than a predetermined correlation threshold, applying the second set of rules of business logic configuration to determine whether the events of the pair of events match a relationship of "cause", meaning the first event of the pair caused the second event of the pair, or "equivalence", meaning the pair of events correspond to the same level of issue, or whether the business logic correlation is "forbidden".

4. The method according to claim 3, wherein if the events of the pair of events match a relationship of "cause" or "equivalence", the events are grouped and a group root-cause is computed in function of the relationship and of the single event diagnosis of each event of the pair of events.

5. The method according to claim 4, comprising iteratively processing groups of events to determine a root-cause diagnosis, wherein two groups of events are merged into a larger group based on applying the second set of rules of business logic configuration on pairs of events of the two groups, a root-cause relationship being determined in function of the relationships of the pairs of events.

6. The method according to claim 3, wherein the second set of rules of business logic configuration defines, for a pair of events, rules on characteristics of said events, comprising dimension values in common, nature of events, network topology and single event diagnosis.

7. The method according to claim 2, wherein the determining of a group root-cause diagnosis, for at least two distinct events comprises, for at least a pair of distinct events having a mathematical correlation score higher than a predetermined correlation threshold, grouping said events in a provisional group of events and applying the second set of rules of business logic configuration to determine subgroups of events which have a common root-cause diagnosis.

8. The method according to claim 7, wherein subgroups of events of the provisional group of events are determined based on topology relationships of network elements related to network dimensions associated to single event diagnosis of events.

9. The method according to claim 8, wherein said topology relationships include topology elements selected through a computation of a contribution ratio of each node or path common to network elements found in single event diagnosis of events of said provisional group; and wherein a topology element with a contribution ratio higher than a predetermined ratio threshold is selected as root-cause diagnosis of a subgroup of events related to said topology element.

10. The method according to claim 1, wherein the single event diagnosis determination further comprises, for a detected event, obtaining the first set of rules of business logic configuration in association with the event, each rule defining a dimension and a test to apply to at least one element of the distributions associated to said dimension in order to select one or several elements as major contributors to the event.

11. The method according to claim 10, wherein a rule of the first set of rules of business logic configuration further indicates, a maximum number of elements to select, a minimum absolute contribution ratio.

12. The method according to claim 11, further comprising, for at least one element of the dimension indicated in the rule, computing an absolute contribution ratio of said element, the absolute contribution ratio being equal to a percentage of occurrence of the element within the distributions linked to said event, during the event duration.

13. The method according to claim 11, further comprising, for selecting a group of several elements, applying a machine learning clustering on distributions of the elements of the dimension indicated in the rule, based on the absolute contribution ratio of each element to the distributions linked to said event, during the event duration, in order to obtain a group of elements having an absolute contribution ratio higher than the minimum absolute contribution ratio.

14. The method according to claim 13, wherein a rule further comprises, if the maximum number of elements to select is at least equal to two, a minimum relative contribution ratio, and wherein the machine learning clustering applies a clustering into two clusters, the method further comprising:

computing a relative contribution ratio as a ratio between the absolute contribution ratios of the cluster centers; and comparing the relative contribution ratio to the minimum contribution ratio defined by the rule to select the cluster with a higher contribution according to the rule.

15. The method according to claim 10, wherein the first set of rules of business logic configuration is organized hierarchically in the form of a rule tree, and wherein at least some rules indicate a type of output among "cause", "intermediate result" and "final result", the method comprising parsing the rule tree to obtain the intermediate and/or final results, and, for each event, the single event diagnosis is computed from the intermediate and final results obtained.

16. The method according to claim 1, wherein the monitoring time signals representative of the operation of the network to detect the occurrence of an event relative to the network traffic comprises an adaptive computation an upper and a lower anomaly threshold value for at least one metric of said time signals, an event being detected if said metric value is above said upper anomaly threshold value or below said lower anomaly threshold value, the adaptive computation comprising statistical analysis to minimize a given function.

17. A non-transitory computer-readable medium comprising software instructions which, when implemented by a programmable device, implement a method for determining root-cause diagnosis of events occurring during the operation of a communication network, according to claim 1.

18. System for determining root-cause diagnosis of events occurring during the operation of a communication network, comprising a programmable device having a processor configured to monitor time signals representative of the operation of the network to detect the occurrence of an event relative to the network traffic, execute a first processing phase, wherein for each detected event, during the duration of said event, the processor implements a module for obtaining distributions of data on several dimensions of the network linked to said event, the distributions being computed during the duration of the event, and responsive to the network being a mobile telephony network, the dimensions including a plurality of Third Generation Partnership Project (3GPP) causes, cells, Radio Access Network (RAN) controllers, Core controllers, handset types, services, subscriber operators, and Internet Protocol (IP) addresses, a module for automatically determining an event root-cause diagnosis of the detected event, called single event diagnosis, comprising at least one element of said distributions, an element being a value taken by a network dimension having a contribution in said distributions of data, the single event diagnosis determination using a first set of rules of business logic configuration organized hierarchically, which are applied according to said hierarchy to select at least one element of said distributions, the selection of more than one element comprising machine learning clustering, implement a second processing phase for determining a root-cause diagnosis for a group of at least two distinct events, and applying a second set of rules of business logic configuration, wherein the second set of rules defines relationships between events.

19. The system according to claim 18, wherein the determining of a root-cause diagnosis for the group of at least two distinct events utilizes the single event diagnosis determined for each of the events of the group of events, and is based on a computation of a mathematical correlation between time signals related to said events.

20. The system according to claim 18, wherein responsive to determining the selection of one element, selecting an element of said distributions that satisfies the rule based on a contribution ratio of the element, the contribution ratio being a percentage of presence of the element within a distribution during the event duration, and in response to determining the selection of more than one element, selecting more than one element using machine learning clustering based on the contribution ratio of the more than one element.

* * * * *